(12) United States Patent
Nakatsugawa

(10) Patent No.: US 6,512,777 B1
(45) Date of Patent: Jan. 28, 2003

(54) COMMUNICATION METHOD AND SYSTEM INVOLVING DISTRIBUTED MANAGEMENT OF CHANNEL ALLOCATION

(75) Inventor: Yoshinori Nakatsugawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/096,605

(22) Filed: Jun. 12, 1998

(30) Foreign Application Priority Data

Jun. 16, 1997 (JP) .............................................. 9-158907
Oct. 3, 1997 (JP) .............................................. 9-271680

(51) Int. Cl.[7] ........................................... H04L 12/407
(52) U.S. Cl. ...................... 370/456; 370/236; 370/454; 370/410; 370/258
(58) Field of Search ................................ 370/251, 235, 370/236, 248, 249, 254, 258, 403, 404, 410, 431, 433, 450, 452, 454, 455, 456, 522, 230, 252

(56) References Cited

U.S. PATENT DOCUMENTS 4,881,074 A * 11/1989 Reichbauer et al. ... 340/825.05
5,003,533 A * 3/1991 Watanabe .................. 370/85.5
5,278,848 A * 1/1994 Yamaguchi ................. 371/49.1
5,309,431 A * 5/1994 Tominaga et al. ............ 370/60
5,497,370 A * 3/1996 Hamada ....................... 370/60

FOREIGN PATENT DOCUMENTS

JP 8-265352 10/1996
JP 8-279819 10/1996

* cited by examiner

Primary Examiner—Ricky Ngo
Assistant Examiner—Tri H. Phan
(74) Attorney, Agent, or Firm—Oblon, Spivak, McClelland, Maier & Neustadt, P.C.

(57) ABSTRACT

Instead of central management of communication paths between repeating installations using a conventional central managing device, in plural repeating installations, a repeating installation compares and refers to another path information where use/free state of plural channels of the other repeating installations comprised in communication data received from the other repeating installations other than the repeating installation itself and use/free state of channels corresponding to one or more node terminal connected with the repeating installation itself, and decides path information of input-output data inputted/outputted into/from the repeating installation itself so that the respective repeating installations perform allocating management of communication channels for the input-output data individually and dispersively.

22 Claims, 14 Drawing Sheets

RH1 MAKES PATH REQUEST TO REPEATING INSTALLATIONS RH1 THROUGH RH3 WITHIN THE PATH REQUEST RANGE FOR SUB CHANNELS (17 TO 20SC)

COMMUNICATION METHOD AND SYSTEM INVOLVING DISTRIBUTED MANAGEMENT OF CHANNEL ALLOCATION

BACKGROUND OF THE INVENTION

1. Field of the Invention

The present invention relates to a communication system which is constituted so that plural repeating installations, to which one or more node terminals are connected, are connected via data transmission lines, and in which data are exchanged between the node terminals, between the repeating installations or between the node terminals and repeating installations, and more specifically relates to a communication method and communication system in which, for example, even when data are exchanged between node terminals belonging respectively to different repeating installations, communication data can be transmitted securely to a destination node terminal specified by an originating source node terminal.

2. Description of the Related Art

Conventionally, a communication system, which is constituted so that plural repeating installations, to which one or more node terminals are connected, are connected via data transmission lines and in which data are exchanged between the node terminals, between the repeating installations or between the node terminals and repeating installations, are generally known.

In the above conventional communication system, when communication data are transmitted from an originating source node terminal to a destination node terminal, communication path management generally adopts the central management method using a central management device.

As for the central management method, a central management device connected with a communication system always monitors use/free state of plural data channels owned by respective repeating installations. At this time, when a node terminal connected to a repeating installation generates a transmission request of communication data, accordingly the repeating installation transmits a use request of the data channel to the central management device. Then, the central management device successively searches plural communication paths from the originating source node terminal to the destination node for data channels which are free or can be changed into a free state so as to allocate the searched data channels to the repeating installations which transmitted the use request. As a result, The communication paths from the originating source node terminal to the destination node terminal can be secured, and the communication data can be transmitted securely from the originating source node terminal to the destination node terminal along the communication paths.

However, according to the communication path management method in the conventional communication system, in the case where data are exchanged between node terminals, for example, every time a node terminal connected with a repeating installation makes a transmission request of communication data, the repeating installation connected to this node terminal transmission a use request of a data channel to the central management device, and accordingly the central management device successively searches plural communication paths from an originating source node terminal to a destination node terminal for data channels which are free or can be changed into the free state, and allocates the searched data channels to the repeating installations transmitting the use request. Since this complicated process should be performed, there arises a problem, which should be solved, such that time required for securing the usable communication paths becomes comparatively long.

SUMMARY OF THE INVENTION

The present invention is devised in view of the above circumstances, and it is an object of the present invention to provide communication method and communication system in which instead of the central management of communication paths between repeating installations using a conventional central managing device, another path information where use/free state of plural channels of repeating installations comprised in communication device received from the repeating installations other than a repeating installation itself and use/free state of channels corresponding to one or more node terminal connected with the repeating installation itself are compared and referred to, path information of input-output data inputted/outputted into/from the repeating installation itself is decided, and allocation of communication channels for the input-output data is managed individually and dispersively so that processing load due to the path management on respective installations is reduced and processing time required for the path management in the repeating installations is shortened, and as a result, even in the case where data are exchanged between node terminals belonging respectively to different repeating installations, the communication data can be transmitted securely from an originating source node terminal to a specified destination node terminal.

It is another object of the present invention to provide a communication method and communication system in which a path request repeating installation requesting transmission of communication data in the plural repeating installations selects definite paths through which the communication data pass based on common free paths between path information of the respective repeating installations, which are obtained by referring to path information containing free state of output side paths of the repeating installations existing within a request path range from an originating source to destination of the communication data, and transmits the definite path information containing the selected paths to the repeating installations existing within the request path range, whereas the respective repeating installations existing within the request path range revise the respective path information based on the received definite path information so that when pass paths for the communication data are secured, the communication procedure is simplified, and as a result, even in the case where data are exchanged between node terminals belonging respective to different repeating installations, the communication data can be transmitted securely from an originating source node terminal to a specified destination node terminal.

In order to solve the above problems, a first aspect of the invention provides a communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:

comparing and referring, in each repeating installation, to another path information, where use/free state of plural channels of the other repeating installations other than the repeating installation itself is described, comprised in communication data received from the other repeating installations and use/free state of channels corresponding to the one or more node terminals connected with the repeating installation itself; and deciding, in each repeating installation, path information of input-output data inputted/outputted into/from the repeating installation itself;

whereby each repeating installation individually and dispersively manages allocation of communication channels of the input-output data.

According the first aspect, instead of a central management of communication paths between the repeating installations using a conventional central managing device, in the plural repeating installations, a repeating installation compares and refers to another path information where use/free state of plural channels of the other repeating installations is described comprised in communication data received by the other repeating installations other than the repeating installation itself and use/free state of channels corresponding to the one or more node terminals connected with the repeating installation itself, and decides path information of input-output data inputted/outputted into/from the repeating installation itself so that the respective repeating installations manage allocation of communication channels of the input-output data individually and dispersively. Therefore, processing load due to the path management in the repeating installations is reduced, and processing time required for the path management in the repeating installations is shortened. As a result, in the case where data are exchanged between node terminals belonging to respectively to different repeating installations, the communication data can be transmitted securely from an originating source node terminal to a specified destination node terminal.

In addition, a second aspect of the invention provides a communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:

comparing and referring, in each repeating installation, to another path information, where use/free state of plural channels of the other repeating installations other than the repeating installation itself is described, comprised in communication data received by the other repeating installations and use/free state of channels corresponding to the one or more node terminals connected with the repeating installation itself;

deciding, in each repeating installation, path information of input-output data inputted/outputted into/from the repeating installation itself;

generating, in each repeating installation, output side path information of the repeating installation itself where the use/free state of the channels of the repeating installation itself is described; and transmitting the communication data including the generated output side path information of the repeating installation itself to the other repeating installations other than the repeating installation itself;

whereby each repeating installation individually and dispersively manages allocation of communication channels of the input-output data.

According to the second aspect, instead of a central management of communication paths between the repeating installations using a conventional central managing device, in the plural repeating installations, a repeating installation compares and refers to another path information where use/free state of plural channels of the other repeating installations is described comprised in communication data received by the other repeating installations other than the repeating installation itself and use/free state of channels corresponding to the one or more node terminals connected with the repeating installation itself, and decides path information of input-output data inputted/outputted into/from the repeating installation itself and generates output side path information of the repeating installation itself where the use/free state of the channels of the repeating installation itself is described as well and transmits the communication data including the generated output side path information of the repeating installation to the other repeating installations other than the repeating installation itself so that the respective repeating installation manage allocation of communication channels of the input-output data individually and dispersively. Therefore, processing load due to the path management in the repeating installations is reduced, and processing time required for the path management in the repeating installations is shortened. As a result, even in the case where data are exchanged between node terminal belonging respectively to different repeating installations, the communication data can be transmitted securely from an originating node terminal to a specified destination node terminal.

Further, it is the point of a third aspect of the invention that the output side path information of the repeating installation itself is generated, based on the use/free state of plural channels of the other repeating installations other than the repeating installation itself described in the other path information, by updating corresponding channels in the other path information from use state to free state in the case where data output whose destination is a node terminal connected with the repeating installation itself exist, and by updating prescribed channels in free states in the other path information to be in use state in the case where data input whose originating source is a node terminal connected with the repeating installation itself.

According to the third aspect, the output side path information of the repeating installation itself is generated based on the use/free state of plural channels of the other repeating installations described in the other path information such that in the case where data output whose destination is a node terminal connected with the repeating installation itself exist, corresponding channels in the other path information in use state are updated to be in free state, whereas in the case where data input whose originating source is a node terminal connected with the repeating installation itself, prescribed channels in free states in the other path information are updated to be in use state.

Furthermore, it is the point of a fourth aspect of the invention that in the case where data input whose originating source is a node terminal connected with the repeating installation itself exist, and a destination of the data input is a node terminal connected with the repeating installation itself, decision of paired pieces of the path information corresponding to the paired node terminals is not prevented.

According to the fourth aspect of the present invention, in the case where data input whose originating source is a node terminal connected with the repeating installation itself exist and a destination of the data input is a node terminal connected with the repeating installation itself, decision of paired pieces of the path information corresponding to the paired node terminals is not prevented.

Further, a fifth aspect of the invention provides a communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:

comparing and referring, in each repeating installation, to another path information, where use/free state of plural channels of the other repeating installations other than the repeating installation itself is described, comprised in communication data received by the other repeating installations and use/free state of channels corresponding to the one or more node terminals connected with the repeating installation itself; and deciding, in each repeating installation, path information of input-output data inputted/outputted into/from the repeating installation itself, based on as to whether or not priority data having high priority whose destination is a node terminal connected with the repeating installation itself exist in the communication data;

whereby each repeating installations individually and dispersively manage allocation of communication channels of the input-output data.

Therefore, processing load due to the path management in the repeating installations is reduced, and processing time required for the path management in the repeating installations is shortened. As a result, in the case where priority data having high priority whose destination is a node terminal connected with the repeating installation itself exist, when channels corresponding to the node terminal as the destination are given priority in allocation to the priority data, the extremely practical communication method can be realized.

In addition, it is the point of a sixth aspect of the invention that when priority data having high priority whose destination is a node terminal connected with the repeating installation itself exist in the communication data, path information is decided so that the priority data are given priority in interruption and output via a desired channel regardless of use/free state of channels corresponding to the node terminal as the destination.

According to the sixth aspect, when priority data having high priority whose destination is a node terminal connected with the repeating installation itself exist in the communication data, path information is decided so that the priority data are given priority in interruption and output via a desired channel regardless of use/free state of channels corresponding to the node terminal as the destination. Therefore, the extremely practical communication method which faithfully reflects priority can be realized.

Further, a seventh aspect of the invention provides a communication system comprising plural repeating installations connected via a data transmission line, each repeating installation connected with one or more node terminals, said communication system exchanging data between the node terminals, between the repeating installations or between the node terminals and repeating installations, said each repeating installation comprising:

a receiving unit receiving communication data including another path information where use/free state of plural channels of the other repeating installations other than the repeating installation itself is described, from the other repeating installation;

a state judging unit judging use/free state of channels corresponding to one or more node terminals connected with the repeating installation itself; and a path information deciding unit comparing and referring to another path information comprised in the communication data received by the receiving unit and the use/free state of the channels corresponding to the one or more node terminals connected with the repeating installation itself judged by the state judging unit to decide path information of input-output data inputted/outputted into/from the repeating installation itself;

whereby the path information deciding unit individually and dispersively manages allocation of communication channels for the input-output data.

According to the seventh aspect, first the receiving unit provided to the plural repeating installations receives the communication data including another path information where use/free state of the plural channels of the other repeating installations is described from the repeating installations other than the repeating installation itself. Meanwhile, the state judging unit judges use/free state of channels corresponding to one or more node terminals connected with the repeating installation itself. The path information deciding unit compares and refers to another path information comprised in the communication data received by the receiving unit and the use/free state of the channels corresponding to the one or more node terminals connected with the repeating installation itself judged by the state judging unit so as to decide path information of input-output data inputted/outputted into/from the repeating installation itself. As a result, the allocation of the communication channels for the input-output data is managed individually and dispersively.

Namely, instead of the central management of the communication paths between the repeating installations using a conventional central managing device, since the plural repeating installations manage the allocation of the communication channels for the input-output data inputted/outputted into/from the repeating installation itself individually and dispersively, processing load due to the path management in the repeating installations is reduced, and processing time required for the path management in the repeating installations is shortened. As a result, in the case where even in the case where data are exchanged between node terminals belonging respectively to different repeating installations, the communication data can be transmitted securely from an originating source node terminal to a specified destination node terminal.

Furthermore, an eighth aspect of the invention provides a communication system comprising plural repeating installations connected via a data transmission line, each repeating installation connected with one or more node terminals, said communication system exchanging data between the node terminals, between the repeating installations or between the node terminals and repeating installations, said each repeating installation comprising:

a receiving unit receiving communication data including another path information where use/free state of plural channels of the other repeating installations other than a repeating installation itself is described, from the other repeating installation;

a state judging unit judging use/free state of channels corresponding to one or more node terminals connected with the repeating installation itself;

a path information deciding unit comparing and referring to another path information comprised in the communication data received by the receiving unit and the use/free state of the channels corresponding to the one or more node terminals connected with the repeating installation itself judged by the state judging unit to decide path information of input-output data inputted/
outputted into/from the repeating installation itself;

a self path information generating unit comparing and
referring to another path information comprised in the
communication data received by the receiving unit and
the use/free state of the channels corresponding to the
one or more node terminals connected with the repeating installation itself judged by the state judging unit to
generate self output side path information where use/
free state of the channels of the repeating installation
itself is described; and a transmitting unit transmitting the communication data
including the self output side path information generated by the self path information generating unit to the
other repeating installations other than the repeating
installation itself;

whereby the path information deciding unit individually
and dispersively manages allocation of communication
channels for the input-output data.

According to the eighth aspect, first the receiving unit receives communication data including another path information where use/free state of plural channels of repeating installations other than a repeating installation itself from the repeating installation itself, the state judging unit judges use/free state of channels corresponding to one or more node terminals connected with the repeating installation itself. The path information deciding unit comparing and referring to another path information comprised in the communication data received by the receiving unit and the use/free state of the channels corresponding to the one or more node terminals connected with the repeating installation itself judged by the state judging unit so as to decide path information of input-output data inputted/outputted into/from the repeating installation itself. As a result, the allocation of the communication channels for the input-output data is managed individually and dispersively. Moreover, the self path information generating unit compares and refers to another path information comprised in the communication data received by the receiving unit and the use/free state of the channels corresponding to the one or more node terminals connected with the repeating installation itself judged by the state judging unit so as to generate self output side path information where use/free state of the channels of the repeating installation itself is described. Accordingly the transmitting unit transmits the communication data including the self output side path information generated by the self path information generating unit to the other repeating installations other than the repeating installation itself.

In such a manner, instead of the central management of the communication paths between the repeating installations using a conventional central managing device, since the plural repeating installations manage the allocation of the communication channels for the input-output data inputted/outputted into/from the repeating installation itself individually and dispersively, processing load due to the path management in the repeating installations is reduced, and processing time required for the path management in the repeating installations is shortened. As a result, in the case where even in the case where data are exchanged between node terminals belonging respectively to different repeating installations, the communication data can be transmitted securely from an originating source node terminal to a specified destination node terminal.

Further, it is the point of a ninth aspect of the invention that the self path information generating unit generates the self output side path information, based on the use/free state of plural channels of the other repeating installations described in the other path information, by updating corresponding channels in another path information from use state to free state in the case where data output whose destination is a node terminal connected with the repeating installation itself exist, and by updating prescribed channels in free states in the other path information to be in use state in the case where data input whose originating source is a node terminal connected with the repeating installation itself.

According to the ninth aspect, the self path information generating unit generates the self output side path information based on the use/free state of plural channels of the other repeating installations described in the other path information such that in the case where data output whose destination is a node terminal connected with the repeating installation itself exist, corresponding channels in another path information in use state are updated to be in free state, whereas in the case where data input whose originating source is a node terminal connected with the repeating installation itself, prescribed channels in free states in the other path information are updated to be in use state.

Further, it is the point of a tenth aspect of the invention that in the case where data input whose originating source is a node terminal connected with the repeating installation itself exist, and a destination of the data input is a node terminal connected with the repeating installation itself, decision of paired pieces of the path information corresponding to the paired node terminals is not prevented.

According to the tenth aspect, in the case where data input whose originating source is a node terminal connected with the repeating installation itself exist and a destination of the data input is a node terminal connected with the repeating installation itself, decision of paired pieces of the path information corresponding to the paired node terminals is not prevented.

In addition, an eleventh aspect of the invention, a communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:

a requesting from a path request repeating installation
requesting transmission of communication data in the
plural repeating installations to repeating installations
existing within a request path range from an originating
source to destination of the communication data to
return path information containing free state of respective output side paths;

selecting, in the path request repeating installation, definite paths through which the communication data pass
based on the respective path information returned from
the repeating installations existing within the request
path range;

transmitting the definite path information containing the
selected definite paths from the path request repeating
installation to the repeating installations existing within
the request path range;

revising the respective path information, in the repeating
installations existing within the request path range,
based on the definite path information received from
the path request repeating installation to secure pass
paths for the communication data prior to transmission
of the communication data from the path request
repeating installation.

According to the eleventh aspect, a path request repeating installation requesting transmission of communication data in the plural repeating installations first requests repeating installations existing within a request path range from an originating source to destination of the communication data to return path information containing free state of respective output side paths. Next, the path request repeating installation selects definite paths through which the communication data pass based on the respective path information returned from the repeating installations existing within the request path range. Then, the path request repeating installation transmits the definite path information containing the selected definite paths to the repeating installations existing within the request path range.

Meanwhile, the repeating installations existing within the request path range revise the respective path information based on the definite path information received from the path request repeating installation.

As a result, prior to transmission of the communication data from the path request repeating installation, pass paths for the communication data can be secured, and the processing procedure between the repeating installations is simplified when the pass paths for the communication data are secured. As a result, even in the case where data are exchanged between node terminal belonging respectively to different repeating installations, the communication data can be transmitted securely from an originating source node terminal to a destination node terminal.

Further, it is the point of a twelfth aspect of the invention, to further comprises the steps of:

obtaining, in the path request repeating installation, common free paths between the path information in the repeating installations existing within the request path range by performing logical operation of the respective path information returned from the repeating installations existing within the request path range; and selecting, in the path request repeating installation, definite paths through which the communication data pass from the obtained common free paths between the path information of the repeating installations existing within the request path range.

According to the twelfth aspect, the path request repeating installation requests the repeating installations existing within the request path range from an originating source to destination of the communication data to return the path information containing free state of the respective output side paths, obtains common free paths between the path information in the repeating installations existing within the request path range by performing logical operation of the respective path information returned from the repeating installations existing within the request path range, selects definite paths through which the communication data pass from the obtained common free paths, and transmits the definite path information containing the selected definite paths to the repeating installations existing within the request path range.

Furthermore, it is the point of a thirteenth aspect the invention that the repeating installations existing within the request path range update the selected definite paths in free state to be in use state based on the definite path information received from the path request repeating installation to revise the respective path information.

According to the thirteenth aspect, the repeating installations existing within the request path range update the selected definite paths in free state to be in use state based on the definite path information received from the path request repeating installation so as to revise the respective path information.

Further, a fourteenth aspect of the invention provides communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:

requesting from a path request repeating installation requesting transmission of communication data in the plural repeating installations to repeating installations existing within a request path range from an originating source to destination of the communication data to return path information containing free state of respective output side paths;

obtaining, in the path request repeating installation, common free paths between the path information in the repeating installations existing within the request path range by performing logical operation of the respective path information returned from the repeating installations existing within the request path range;

selecting, in the path request repeating installation, definite paths through which the communication data pass from the obtained common free paths between the path information of the repeating installations existing within the request path range;

transmitting the definite path information containing the selected definite paths from the path request repeating installation to the repeating installations existing within the request path range;

updating, in the repeating installations existing within the request path range, the selected definite paths in free state to be in use state based on the definite path information received from the path request repeating installation to revise the respective path information and thus securing pass paths for the communication data prior to transmission of the communication data from the path request repeating installation.

According to the fourteenth aspect, the path request repeating installation first requests repeating installations existing within a request path range from an originating source to destination of the communication data to return path information containing free state of respective output side paths. Next, the path request repeating installation obtains common free paths between the path information in the repeating installations existing within the request path range by performing logical operation of the respective path information returned from the repeating installations existing within the request path range, and selects definite paths through which the communication data pass from the obtained common free paths. Then, the path request repeating installation transmits the definite path information containing the selected definite path to the repeating installations existing within the request path range.

Meanwhile, the repeating installations existing within the request path range update the selected definite paths in free state to be in use state based on the definite path information received from the path request repeating installation so as to revise the respective path information.

As a result, prior to transmission of the communication data from the path request repeating installation, pass paths for the communication data can be secured, and when the pass paths for the communication data, the communication procedure between the repeating installations is simplified. As a result, even in the case where data are exchanged between node terminal belonging respectively to different repeating installations, the communication data can be transmitted securely from an originating source node terminal to a specified destination node terminal.

In addition, a fifteenth aspect of the invention provides communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations comprising:

a path information return requesting unit requesting the repeating installations existing within the request path range from a transmission source to destination of the communication data to return path information containing free state of respective output side paths;

a selecting unit selecting definite paths through which the communication data pass based on the respective path information returned from the repeating installations existing within the request path range; and a definite path information transmitting unit transmitting the definite path information containing the definite paths selected by the selecting unit to the repeating installations existing within the request path range; and the respective repeating installations existing within the request path range comprising:

a definite path information receiving unit receiving the definite path information from the path request repeating installation; and a path information revising unit revising the respective path information based on the definite path information received by the definite path information receiving unit;

whereby the respective repeating installations existing within the request path range secures pass paths of the communication data prior to transmission of the communication data from the path request repeating installation.

According to the fifteenth aspect, in the path request repeating installation, the path information return requesting unit requests the repeating installations existing within the request path range from a transmission source to destination of the communication data to return path information containing free state of respective output side paths. Next, the selecting unit selects definite paths through which the communication data pass based on the respective path information returned from the repeating installations existing within the request path range. Then, the definite path information transmitting unit transmits the definite path information containing the definite paths selected by the selecting unit to the repeating installations existing within the request path range.

Meanwhile, in the respective repeating installations existing within the request path range, the definite path information receiving unit receives the definite path information from the path request repeating installation. The path information revising unit revises the respective path information based on the definite path information received by the definite path information receiving unit.

As a result, prior to transmission of the communication data from the path request repeating installation, pass paths of the communication data can be obtained, and when the pass paths for the communication data are secured, the communication procedure between the repeating installations is simplified. As a result, even in the case where data are exchanged between node terminal belonging respectively to different repeating installations, the communication data can be transmitted securely from an originating source node terminal to a specified destination node terminal.

Further, it is the point of a sixteenth aspect of the invention that the path request repeating installation further comprises a free path operating unit obtaining common free paths between path information of the repeating installations existing within the request path range by performing the logical operation on the respective path information returned from the repeating installations existing within the request path range; and the selecting unit selecting definite paths through which the communication data pass from the common free paths between the path information of the repeating installations existing within the request path range obtained by the free path operating unit.

According to the sixteenth aspect, in the path request repeating installation, the free path operating unit obtains common free paths between path information of the repeating installations existing within the request path range by performing the logical operation on the respective path information returned from the repeating installations existing within the request path range. The selecting unit selects definite paths through which the communication data pass from the common free paths between the path information of the repeating installations existing within the request path range obtained by the free path operating unit.

Further, it is the point of a seventeenth aspect of the invention that the path information revising unit updates the selected definite paths in free state to be in use state based on the definite path information received by the definite path information receiving unit so as to revise the respective path information.

According to the seventeenth aspect, the path information revising unit updates the selected definite paths in free state to be in use state based on the definite path information received by the definite path information receiving unit so as to revise the respective path information.

In addition, an eighteenth aspect of the invention provides a communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations comprising:

a path information return requesting unit requesting the repeating installations existing within the request path range from an originating source to destination of the communication data to return path information containing free state of respective output side paths;

a free path operating unit obtaining common free paths between path information of the repeating installations existing within the request path range by performing the logical operation on the respective path information returned from the repeating installations existing within the request path range;

a selecting unit selecting definite paths through which the communication data pass from the common free paths between the path information of the repeating installations existing within the request path range obtained by the free path operating unit; and a definite path information transmitting unit transmitting the definite path information containing the definite paths selected by the selecting unit to the repeating installations existing within the request path range; and the respective repeating installations existing within the request path range comprising:
  a definite path information receiving unit receiving the definite path information from the path request repeating installation; and
  a path information revising unit updating the definite paths selected by the selecting unit in free state to be in use state based on the definite path information received by the definite path information receiving unit so as to revise the respective path information;
  whereby the respective repeating installations existing within the request path range secure pass paths of the communication data prior to transmission of the communication data from the path request repeating installation.

According to the eighteenth aspect, in the path request repeating installation, first the path information return requesting unit requests the repeating installations existing within the request path range from an originating source to destination of the communication data to return path information containing free state of respective output side paths. Next, the free path operating unit obtains common free paths between path information of the repeating installations existing within the request path range by performing the logical operation on the respective path information returned from the repeating installations existing within the request path range. Moreover, the selecting unit selects definite paths through which the communication data pass from the common free paths obtained by the free path operating unit. Then, the definite path information transmitting unit transmits the definite path information containing the definite paths selected by the selecting unit to the repeating installations existing within the request path range.

Meanwhile in the respective repeating installations existing within the request path range, the definite path information receiving unit receives the definite path information from the path request repeating installation. Accordingly, the path information revising unit updates the definite paths selected by the selecting unit in free state to be in use state based on the definite path information received by the definite path information receiving unit so as to revise the respective path information.

As a result, prior to transmission of the communication data from the path request repeating installation, pass paths of the communication data can be obtained, and when the pass paths for the communication data are secured, the communication procedure between the repeating installations is simplified. As a result, even in the case where data are exchanged between node terminal belonging respectively to different repeating installations, the communication data can be transmitted securely from an originating source node terminal to a specified destination node terminal.

Further, a nineteenth aspect of the invention provides communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:
  returning common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation requesting transmission of communication data in the plural repeating installations;
  selecting, in the path request repeating installation, definite paths through which the communication data pass from the returned common free paths between the output side path information of the repeating installations;
  transmitting the definite path information containing the selected definite paths to the repeating installations existing within the request path range; and
  revising, in the respective repeating installations existing within the request path range, the respective path information based on the definite path information received from the path request repeating installation to secure pass paths for the communication data prior to transmission of the communication data from the path request repeating installation.

According to the nineteenth aspect, a path request repeating installation requesting transmission of communication data in the plural repeating installations first returns common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation. Next, the path request repeating installation selects definite paths through which the communication data pass from the returned common free paths between the output side path information of the repeating installations. Then, the path request repeating installation transmits the definite path information containing the selected definite paths to the repeating installations existing within the request path range.

Meanwhile, the respective repeating installations existing within the request path range revise the respective path information based on the definite path information received from the path request repeating installation.

As a result, prior to transmission of the communication data from the path request repeating installation, pass paths for the communication data can be secured, and when the pass paths for the data communication are secured, the communication procedure between the repeating installations is simplified. As a result, even in the case where data are exchanged between node terminal belonging respectively to different repeating installations, communication data can be transmitted securely from an originating source node terminal to a destination node terminal.

Furthermore, a twentieth aspect of the invention provides a communication method used in a communication system arranged by connecting plural repeating installations, to which one or more node terminals are connected, via a data transmission line, said communication method exchanging data between the node terminals, between the repeating installations or between the node terminals and repeating installations, said communication method comprising the steps of:
  returning common free paths between output side path information of the respective repeating installations, which are obtained by referring to path information containing free state of output side paths of the repeating installations existing within a request path range from an originating source to destination of the communication data, from the repeating installations existing within the request path range to the path request repeating installation requesting transmission of communication data in the plural repeating installations;

selecting, in the path request repeating installation, definite paths through which the communication data pass from the returned common free paths between the output side path information of the repeating installations;

transmitting the definite path information containing the selected definite paths to the repeating installations existing within the request path range;

updating, in the repeating installations existing within the request path range, the selected definite paths in free state to be in use state based on the definite path information received from the path request repeating installation to revise the respective path information, thereby to secure pass paths for the communication data prior to transmission of the communication data from the path request repeating installation.

According to the twentieth aspect, first the path request repeating installation requesting transmission of communication data in the plural repeating installations returns common free paths between output side path information of the respective repeating installations, which are obtained by referring to path information containing free state of output side paths of the repeating installations existing within a request path range from an originating source to destination of the communication data, from the repeating installations existing within the request path range to the path request repeating installation. Next, the path request repeating installation selects definite paths through which the communication data pass from the common free paths between the output side path information returned from the repeating installations existing within the request path range. Then, the path request repeating installation transmits the definite path information containing the selected definite paths to the repeating installations existing within the request path range.

Meanwhile, the respective repeating installations existing within the request path range update the selected definite paths in free state to be in use state based on the definite path information received from the path request repeating installation so as to revise the respective path information.

As a result, prior to transmission of the communication data from the path request repeating installation, pass paths for the communication data are secured, and when the path paths for the communication data are secured, and the communication procedure between the repeating installations is simplified. As a result, even in the case where data are exchanged between node terminals belonging respectively to different repeating installations, the communication data can be transmitted securely from an originating source node terminal to a destination node terminal.

Further, a twenty-first aspect of the invention provides a communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations comprising:

a path information return requesting unit requesting to return common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation;

a selecting unit selecting definite paths through which the communication data pass based on the respective path information returned from the repeating installations existing within the request path range; and a definite path information transmitting unit transmitting the definite path information containing the selected definite paths selected by the selecting unit to the repeating installations existing within the request path range; and the respective repeating installations existing within the request path range comprising:

a definite path information receiving unit receiving the definite path information from the path request repeating installation; and a path information revising unit revising the respective path information based on the definite path information received by the definite path information receiving unit;

whereby the respective repeating installations existing within the request path range secure pass paths for the communication data prior to transmission of the communication data from the path request repeating installation.

According to the twenty-first aspect, in the path request repeating installation, first the path information return requesting unit requests to return common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation. Next, the selecting unit selects definite paths through which the communication data pass from the common free paths between the output side path information of the repeating installations returned from the repeating installations existing within the request path range. Then, the definite path information transmitting unit transmits the definite path information containing the selected definite paths selected by the selecting unit to the repeating installations existing within the request path range.

Meanwhile, in the respective repeating installations existing within the request path range, the definite path information receiving unit receives the definite path information from the path request repeating installation. The path information revising unit revises the respective path information based on the definite path information received by the definite path information receiving unit.

As a result, prior to transmission of the communication data from the path request repeating installation, pass paths for the communication data can be secured, and the communication procedure between the repeating installations is simplified. As a result, even in the case where data are exchanged between node terminals belonging respectively to different repeating installations, the communication data can be transmitted securely from an originating source node terminal to a destination node terminal.

Further, a twenty-second aspect of the invention provides a communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations comprising:
a path information return requesting unit requesting to return common free paths between output side path information of the respective repeating installations, which are obtained by referring to path information containing free state of output side paths of the repeating installations existing within a request path range from an originating source to destination of the communication data, from the repeating installations existing within the request path range to the path request repeating installation;
a selecting unit selecting definite paths through which the communication data pass based on the respective path information returned from the repeating installations existing within the request path range; and
a definite path information transmitting unit transmitting the definite path information containing the definite paths selected by the selecting unit to the repeating installations existing within the request path range; and
the respective repeating installations existing within the request path range comprising:
a definite path information receiving unit receiving the definite path information from the path request repeating installation; and
a path information revising unit updating the definite paths selected by the selecting unit in free state to be in use state based on the definite path information received by the definite path information receiving unit so as to revise the respective path information;
whereby the respective repeating installations existing within the request path range secure pass paths for the communication data prior to transmission of the communication data from the path request repeating installation.

According to the twenty-second aspect, in the path request repeating installation, first the path information return requesting unit requests to return common free paths between output side path information of the respective repeating installations, which are obtained by referring to path information containing free state of output side paths of the repeating installations existing within a request path range from an originating source to destination of the communication data, from the repeating installations existing within the request path range to the path request repeating installation. Next, the selecting unit selects definite paths through which the communication data pass from the common free paths between the output side path information of the repeating installations returned from the repeating installations existing within the request path range. Then, the definite path information transmitting unit transmits the definite path information containing the definite paths selected by the selecting unit to the repeating installations existing within the request path range.

Meanwhile, in the respective repeating installations existing within the request path range comprise, the definite path information receiving unit receives the definite path information from the path request repeating installation. The path information revising unit updates the definite paths selected by the selecting unit in free state to be in use state based on the definite path information received by the definite path information receiving unit so as to revise the respective path information.

As a result, prior to transmission of the communication data from the path request repeating installation, pass paths for the communication data can be secured, and the communication procedure between the repeating installations is simplified. As a result, even in the case where data are exchanged between node terminals belonging respectively to different repeating installations, the communication data can be transmitted securely from an originating source node terminal to a destination node terminal.

DETAILED DESCRIPTION OF THE PREFERRED EMBODIMENTS

The following describes in detail embodiments of a communication method and communication system according to the present invention on reference to the drawings.

As for the communication system of a first embodiment according to the present invention, the description is given by exemplifying the case where the communication system is applied to a vehicle-borne network in which various vehicle-borne functional equipments are connected via data transmission lines.

Figure 1:
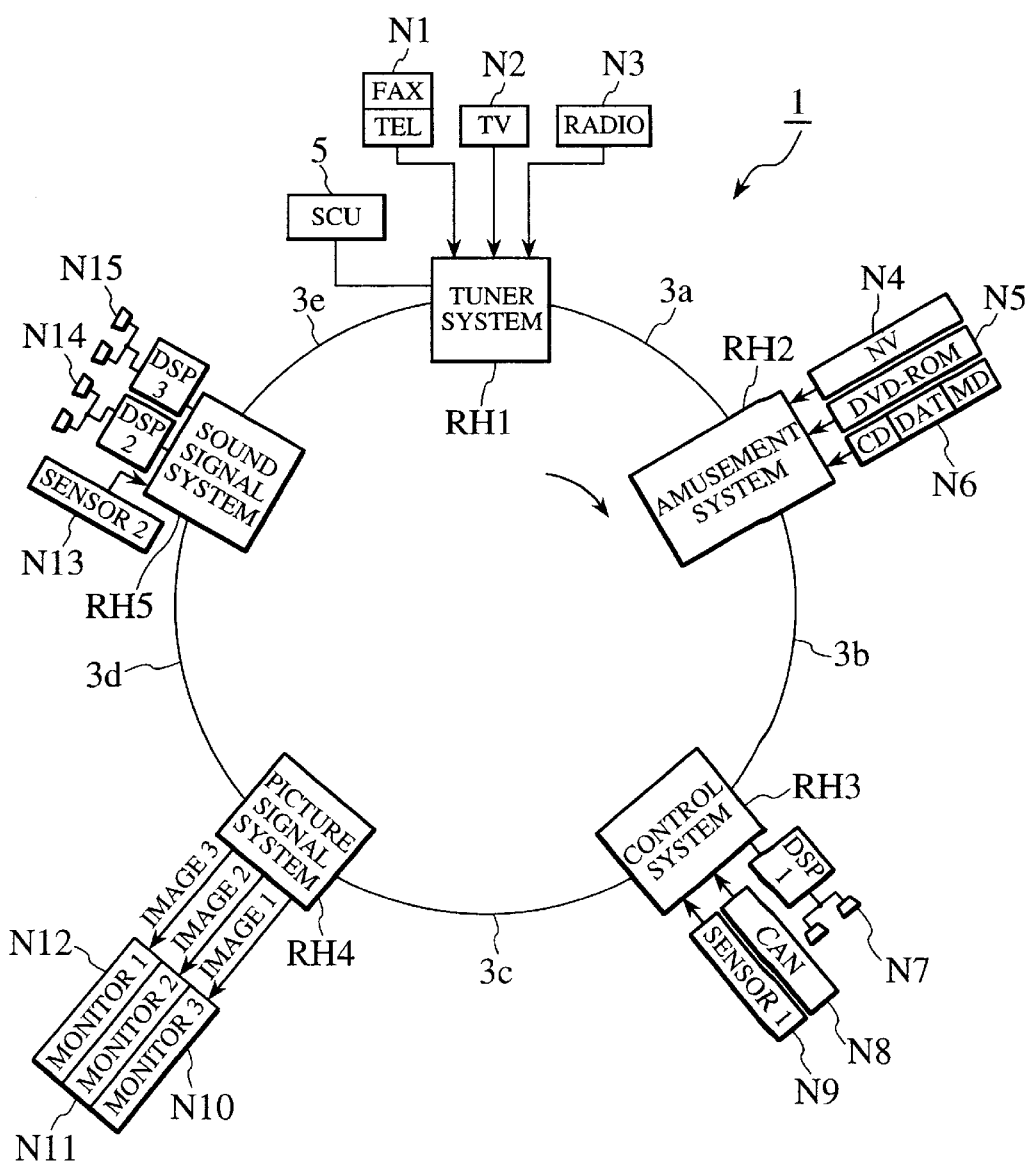
FIG. 1 is a schematic block constitutional drawing showing a whole communication system which is common to first, second and third embodiments of the present invention.

Now referring to FIG. 1, a communication system 1 of the present invention is arranged so that plural route hubs RH1, RH2, RH3, RH4 and RH5 as repeating installations are connected via a loop-formed data transmission lines 3 in which data can be exchanged therebetween. The route hub RH1 is connected with a system control unit (SCU) 5 for generally managing synchronous control of the whole communication system 1, respective route hubs RH composing the communication system 1, address setting operation of respective functional equipments N, mentioned, later, etc. As a network topology of the communication system 1, besides the aforementioned loop form, suitable forms such as a bus form and star form can be adopted.

The plural route hubs RH are connected respectively with one or more various functional equipments N1 through N15 as node terminals, and data can be exchanged between the route hubs RH, between the functional equipments or between the functional equipments N and route hubs RH via the data transmission lines 3 which allow transmission of communication data to a direction of an arrow in FIG. 1, for example. In the case where the communication system of the present invention is applied to a vehicle, for example, as the functional equipments N, a portable telephone, facsimile (FAX), digital TV, radio receiver, navigation device (NV), DVD (Digital Video Disc or Digital Versatile Disc)-ROM device, CD (Compact Disc) reproducer, DAT (Digital Audio Taperecorder), MD (Mini Disc) reproducer, audio amplifier containing a digital signal processor (DSP), CAN (Controller Area Network) interface, various sensors such as bearing sensor and vehicle speed sensor, a monitor unit, vehicle-borne personal computer, etc. can be adopted suitably.

The plural route hubs RH are divided per functional unit into a tuner system for inputting a radio wave from a facsimile (FAX), portable telephone (TEL), etc. and a broadcasting radio wave from a digital TV or radio receiver from the functional equipments N, an amusement system for inputting a sound signal and picture signal, information about traffic jam from the functional equipments N such as a navigation device (NV), a control system for inputting control information, etc. from the functional equipments N such as various sensors, a picture signal system for outputting a picture signal to a monitor unit, etc., and a sound signal system for outputting a sound signal to an audio amplifier, etc. containing a digital signal processor (DSP).

Inherent addresses are previously set respectively in the plural route hubs RH and functional equipments N by an address setting operation, for example, by the system control unit (SCU) 5 when the communication system 1 is turned on so that they can be identified. These addresses are used for specifying a destination, transmission source or originating source in the case where data are exchanged between the route hubs RH, between the functional equipments or between the functional equipments N and route hubs RH via the data transmission line 3. In the example of FIG. 1, inherent self addresses are set respectively in the plural route hubs RH1, RH2, RH3, RH4 and RH5, whereas inherent self addresses are set respectively in the plural functional equipments N1, N2, N3 . . . , N15.

Figure 7:
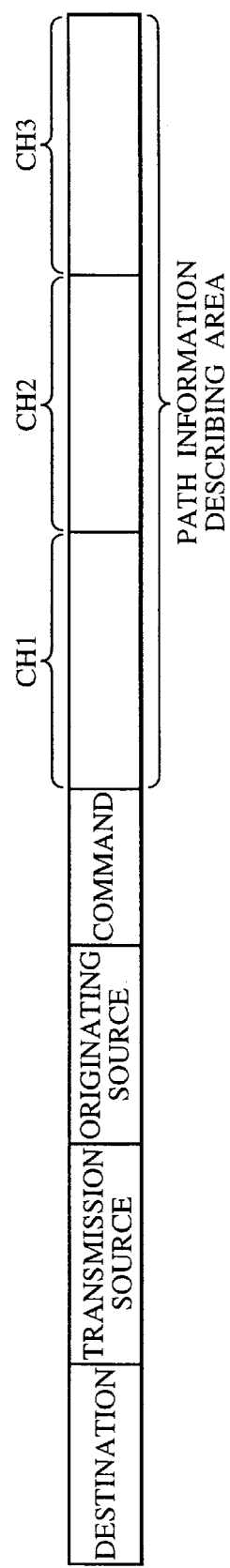
FIG. 7 is a drawing showing a data format used in the communication system according to the first embodiment of the present invention.

Here, the description is given as to a frame format of communication data transmitted through the communication system 1 on reference to FIG. 7, plural information description areas where various information is described are set in a signal frame of the communication data, and the plural information description areas are composed of a destination address section where a destination address is described, a transmission source address section where a transmission source address is described, an originating source address section where an originating source address is described, a command section where various commands and control information are described, and path information description area where use/free states of plural channels allocated respectively to the functional equipments N connected with the respective route hubs RH are described.

Figure 2:
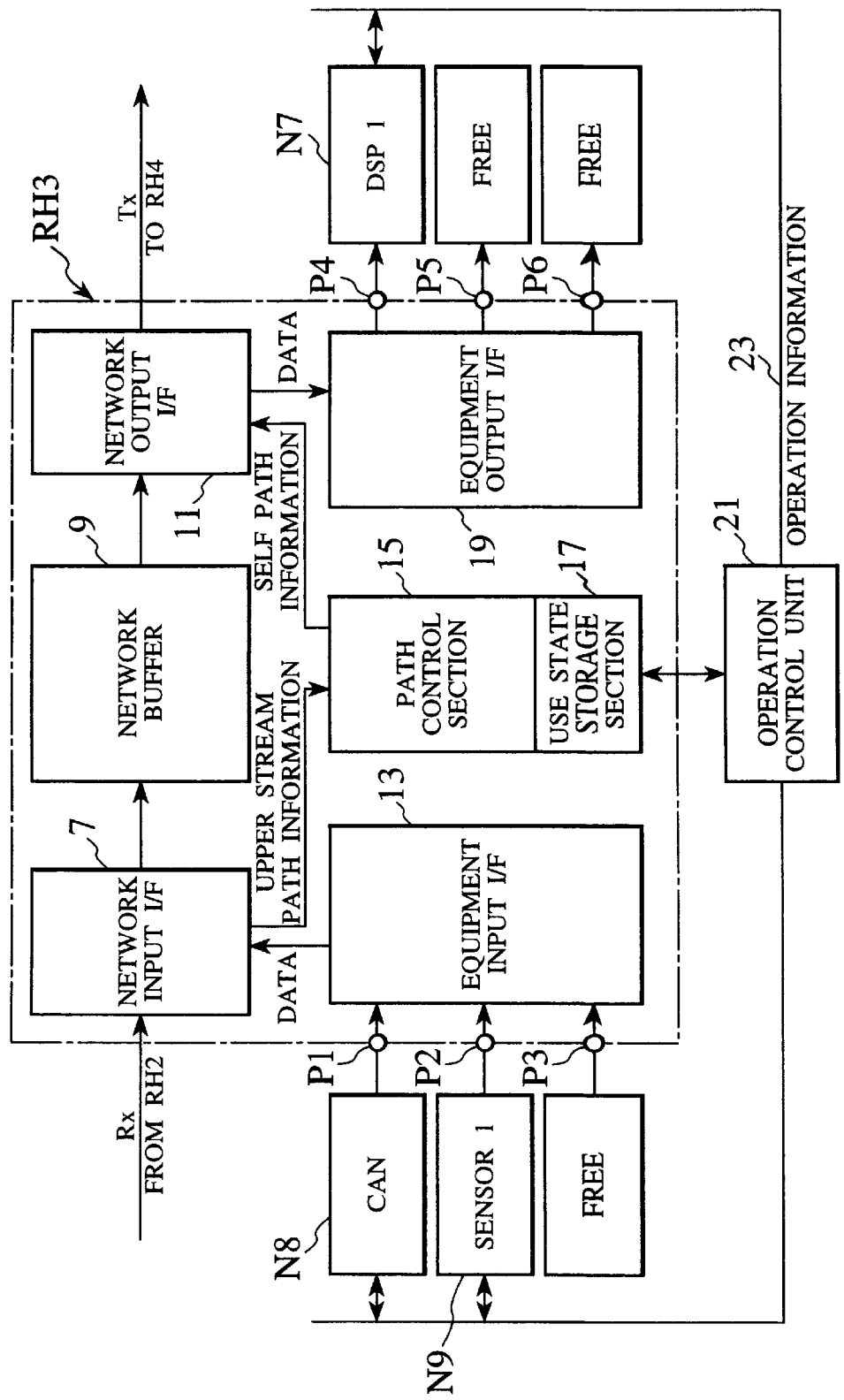
FIG. 2 is a block constitutional drawing of a repeating installation to be a main section of the communication system according to the first embodiment.

The following describes a block arrangement in the route hubs RH as a repeating installation by typically exemplifying the route hub RH3 on reference to FIG. 2. The route hub RH3 comprises:

- a network input interface (hereinafter, "interface" is abbreviated as "I/F") 7 for inputting various instructions and operation information of the functional equipments, communication data including source data or communication data transmitted from an equipment input I/F 13, mentioned later, all of which are transmitted from the route hub RH2 positioned on the upper stream side via the data transmission line 3*b*;

- a network buffer 9 for temporarily storing the communication data inputted via the network input I/F 7;

- a network output I/F 11 for transmitting and outputting the communication data to the route hub RH4 positioned on the lower stream side via the data transmission line 3*c*;

- an equipment input I/F 13 having first through third input ports P1, P2 and P3 for inputting communication data transmitted from the functional equipments N8 and N9 connected with the equipment input I/F 13 via these first through third input ports P1, P2 and P3, performing suitable converting processes on the inputted communication data to transmit the converted communication data to the network input I/F 7;

- an operation control unit 21, which is connected with the various functional equipments N7, N8 and N9 connected with the route hub RH3 via a communication line 23, for always monitoring and inputting operation information relating to operation states of the functional equipments N7, N8 and N9 and transmitting the inputted operation information to a path control section 15, mentioned later, whereas inputting the operation information of the functional equipments N7, N8 and N9 transmitted from the path control section 15 and distributing so as to transmit the inputted operation information to the functional equipments N7, N8 and N9;

a use state storage section 17 for always updating and storing the use/free states of sub channels of input-output (hereinafter, "input-output" is abbreviated as "I/O") ports allocated respectively to the functional equipments N7, N8 and N9 according to the operation information of the functional equipments N7, N8 and N9 inputted from the operation control unit 21;

a path control section 15 which has a self output side path information generating function for inputting upper stream free information containing the use/free state of the channel in the route hub RH2 positioned on the upper stream side via the network input I/F 7, comparing and referring to the inputted upper stream free information and the use/free states of the sub channels read from the use state storage section 17 to generate self output side path information containing the use/free state of the channel in the route hub RH3 and to transmit the generated self output side path information to the network output I/F 11, and has an operation information extracting 15 function for inputting various instructions and operation information of the functional equipments N or communication data including source data, etc. from the route hub RH2 positioned on the upper stream side via the network input I/F 7, and extracting the operation information of the functional equipments N7, N8 and N9 connected with the route hub RH3 from the inputted operation information of the functional equipments N to transmit the extracted operation information to the operation control unit 21; and an equipment output I/F 19 having first through third output ports P4, P5 and P6, for inputting the communication data transmitted from the network output I/F 11, and performing a suitable converting process on the inputted communication data to distribute and output the converted communication data to the functional equipment N7 via the fourth output port P4 selected from the first through third output ports P4, P5 and P6.

Figure 3:
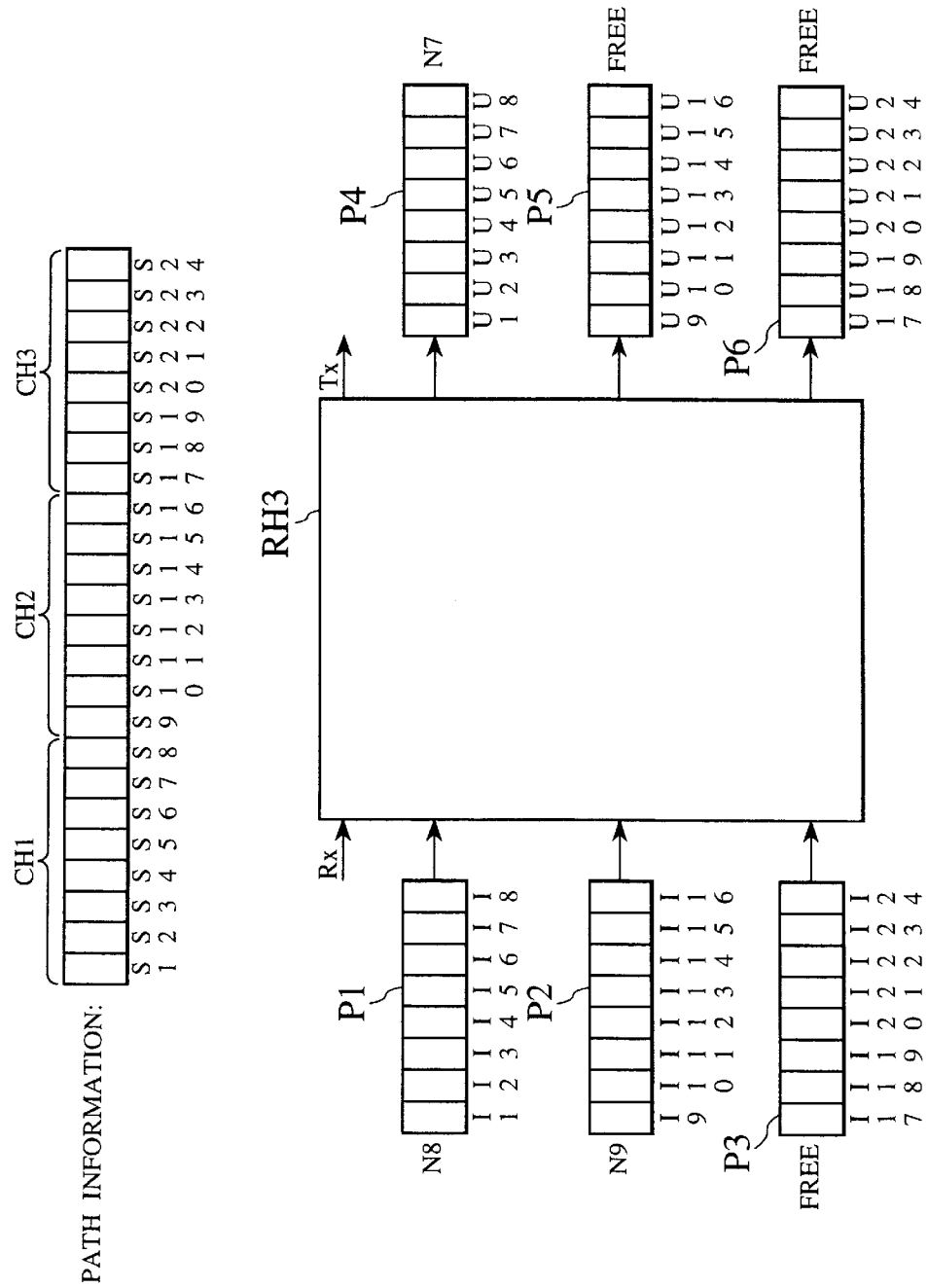
FIG. 3 is a state transition diagram schematically showing a generating process of self output side path information used in the communication system according to the first embodiment.

Here, prior to the description about the generating process of the self output side path information in the route hubs RH as the repeating installation, the description is given as to the arrangement of the path information frame described in the path information description area in the communication data and the arrangement of the first through third I/O ports on reference to FIG. 3. In the example of FIG. 3, transmission capacity of the data transmission line 3 is 192 bit/unit time, namely, communication data of 64 bit only for three channels can be transmitted via the data transmission line 3 per unit time. The respective channels can be divided into eight sub channels in the unit of 8 bit to be used, and communication data of up to one channel can be inputted into and outputted from the first through third I/O ports, and "1" is described in the information description area corresponding to each sub channel in the use state, whereas "0" is described therein in the free state.

The path information frame has an information description area where the use/free states of three channels CH1, CH2 and CH3 in the various functional equipments N can be described, and the respective channels are further divided sub channels of 8 bit, so the path information frame is composed of totally twenty-four sub channels S1 through S24.

The sub channels of 8 bit are allocated respectively to the first through third input ports P1, P2 and P3, and the first through third input ports are composed of totally twenty-four sub channels I1 through I24.

Meanwhile, the sub channels of 8 bit are allocated respectively to the first through third output ports P4, P5 and P6, and the first through third output ports are composed of totally twenty-four sub channels U1 through U24.

Figure 4:
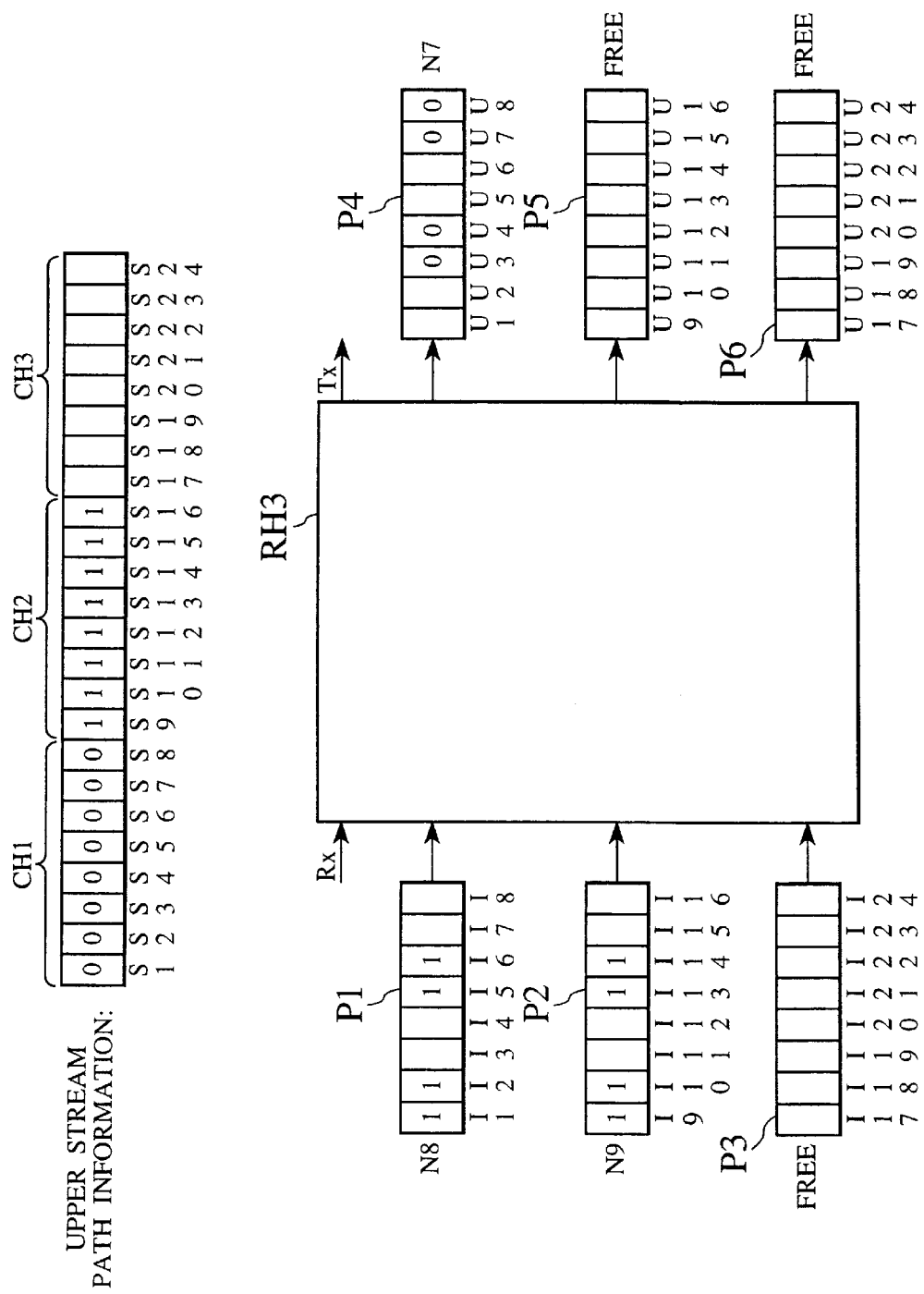
FIG. 4 is a state transition diagram schematically showing the generating process of the self output side path information used in the communication system according to the first embodiment.
Figure 5:
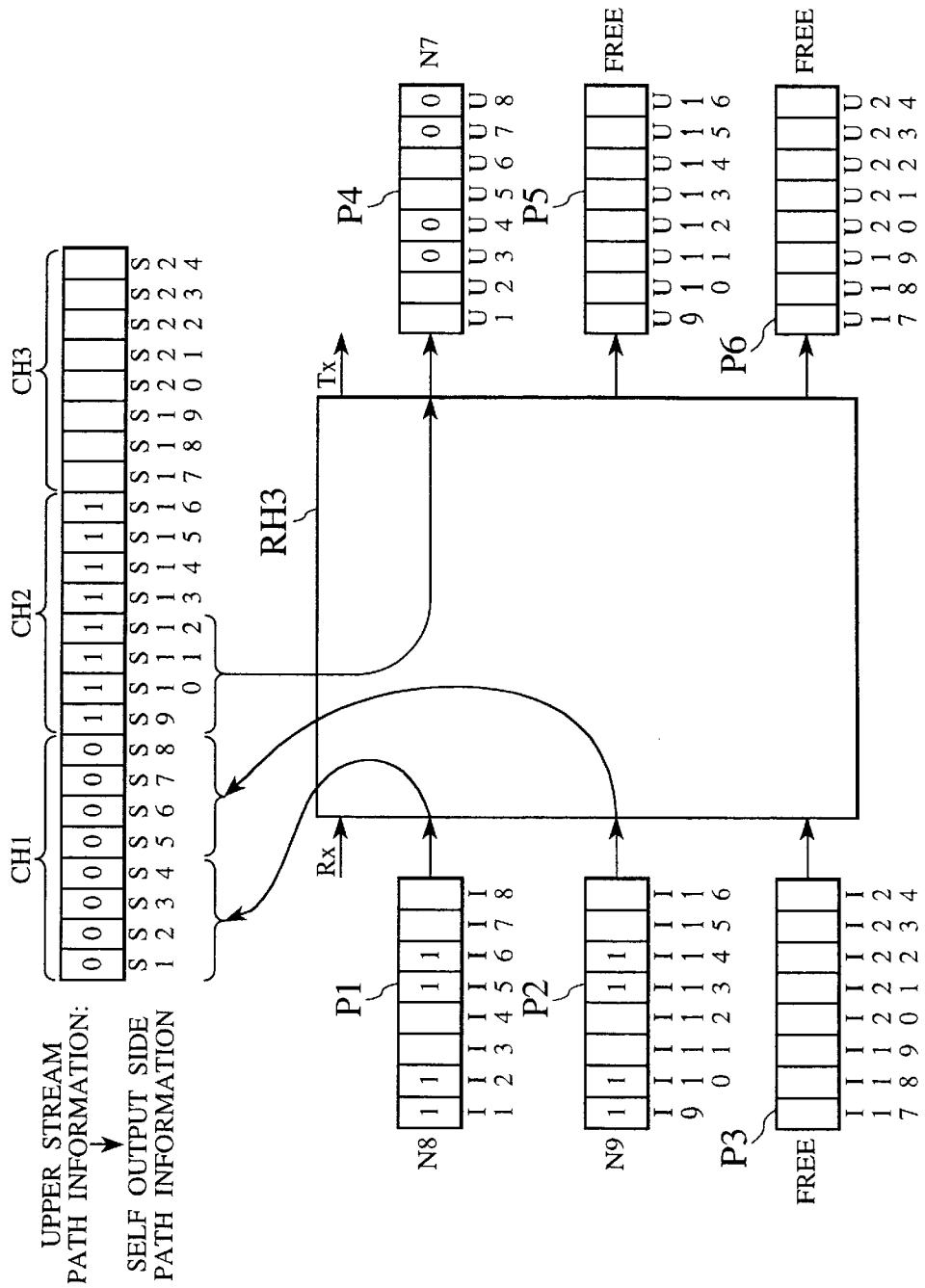
FIG. 5 is a state transition diagram schematically showing the generating process of the self output side path information used in the communication system according to the first embodiment.
Figure 6:
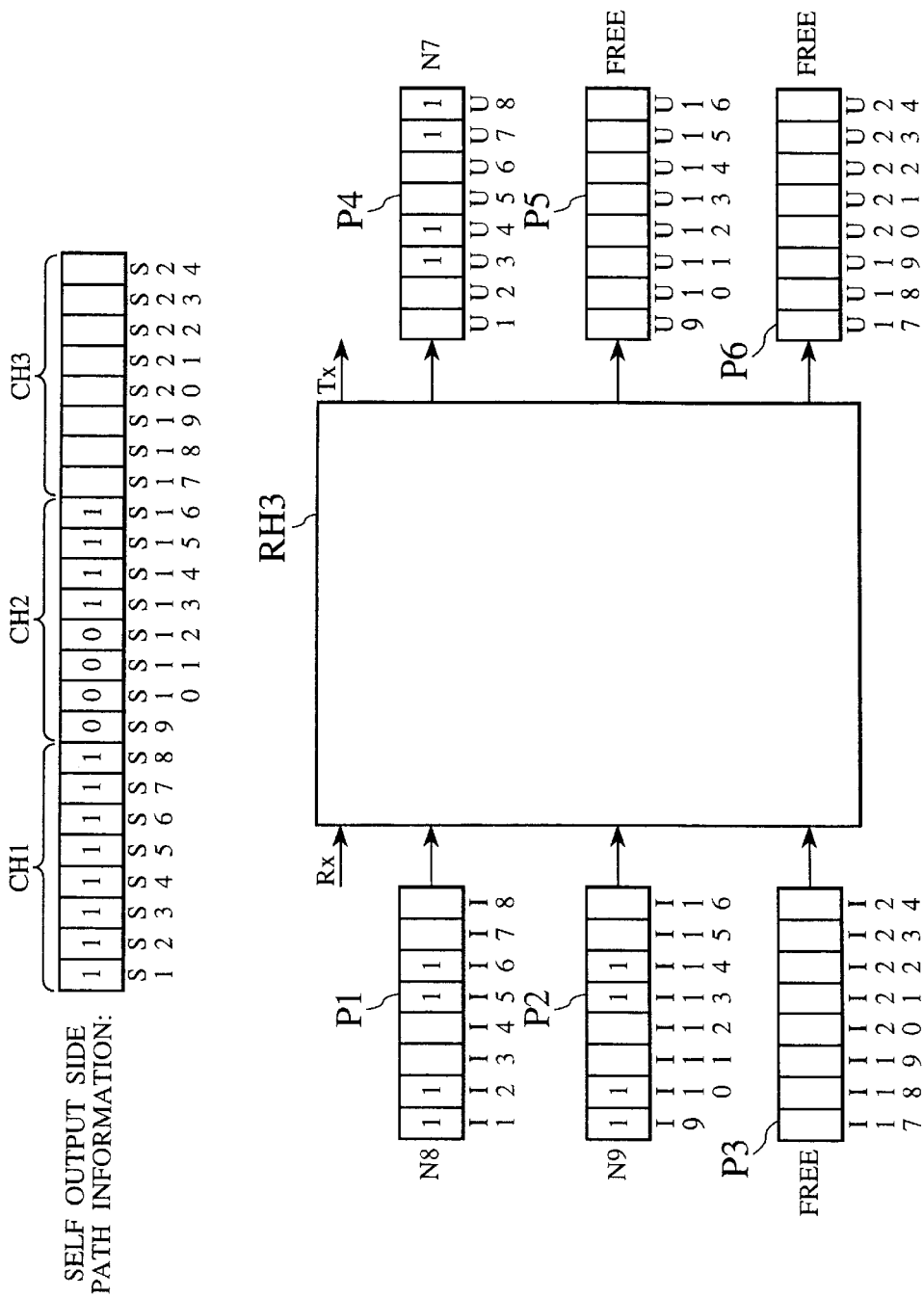
FIG. 6 is a state transition diagram schematically showing the generating process of the self output side path information used in the communication system according to the first embodiment.

The following describes successively the processing procedure of the communication data in the respective route hubs RH by typically exemplifying the route hub RH3 on reference to the state transition diagrams schematically showing the generating process of the self output side path information shown in FIGS. 4 through 6.

First, the description is given as to the case where data which specify the functional equipment as a destination connected with the route hub 3 exist in the received communication data. As shown in FIG. 4, when receiving the communication data including an upper stream path information frame transmitted from the route hub RH2 positioned on the lower stream side of the route hub 3, the route hub RH3 judges as to whether or not "1" representing the use state is described in the upper stream path information frame of the communication data received this time. As a result of the judgment, when "1" representing the use state is described in eight sub channels S9 through S16, for example, in the upper stream path information frame, the route hub RH3 judges as to whether or not the functional equipment N connected therewith is specified as the destination of the data corresponding to the sub channels S9 through S16. As a result of the judgment, when the functional equipment N connected therewith is specified as the destination of the data corresponding to the sub channels S9 through S16, the route hub RH3 refers to the operation information of the functional equipment N specified as the destination as the data so as to judge as to whether or not less than necessary number of "0" representing the free states are described in the sub channels of the output port corresponding to the functional equipment N. As a result of the judgment, when not less than necessary number of "0" are described in the sub channels of the output port corresponding to the functional equipment N, namely, when not less than necessary number of sub channels in the free state exist, as shown in FIGS. 5 and 6, the route hub RH3 allocates the sub channels in the free state as output destinations of the data corresponding to the sub channels S9 through S16.

More specifically, in the present embodiment, the functional equipment N7 is specified as the destination of the data corresponding to the four sub channels S9 through S12 comprised in the upper stream path information frame, and since the sub channels U3, U4, U7 and U8 of the first output port P4 corresponding to the functional equipment N7 specified as the destination are in the free state, the sub channels U3, U4, U7 and U8 of the first output port P4 are allocated as the output destination of the data corresponding to the sub channels S9 through S12. The data whose destination is the functional equipment N7 in the communication data received by the route hub RH3 are subject to the process for establishing the path information of the prescribed sub channels S9 through S12 comprised in the upper stream path information frame and of the sub channels U3, U4, U7 and U8 of the output port corresponding to the functional equipment N7 in the route hub RH3, and the communication paths of the data in the route hub RH3 are secured so that the data are outputted to the functional equipment N7. In the case where only the functional equipment N7 is specified as the destination of the data corresponding to the sub channels S9 through S12 in the upper stream path information frame. Namely, in the case where the data are transmitted to individual destinations, when the process for allocating the output destinations of the data is performed, output of the data corresponding to the sub channels S9 through S12 is completed. For this reason, as shown in FIG. 6, the state of the sub channels S9 through S12 in the self path information frame are updated to be "0" representing the free state.

Meanwhile, the description is given as to the case where the functional equipment N belonging to another route hub RH is specified as the destination of the communication data outputted from the functional equipment connected with the route hub RH3. As shown in FIG. 4, the route hub RH3 always monitors and inputs the operation information of the various functional equipments N8 and N9 connected with the route hub RH3, and refers to the inputted operation information so as to judge as to whether or not "1" representing the use state is described in the sub channels of the first and second input ports P1 and P2 corresponding to the functional equipments N8 and N9. As a result of the judgment, when "1" representing the use state is described in the eight sub channels I1, I2, I5, I6, I9, I10, I13 and I14, for example, in the sub channels of the first and second input ports P1 and P2, the route hub RH 3 further judges as to whether or not the functional equipment N belonging to another route hub RH is specified as the destination of the data corresponding to the respective sub channels I1. As a result of the judgment, when the functional equipment N belonging to another route hub RH is specified as the destination of the data corresponding to the respective sub channels I1, the route hub RH3 refers to the use/free state of the sub channels comprised in the upper stream path information frame so as to judge as to whether or not eight sub channels where "0" representing the free state is described exist in the upper stream path information frame. As a result of the judgment, when eight sub channels where "0" representing the free state is described exist in the upper stream path information frame, as shown in FIGS. 5 and 6, the route hub RH3 allocates the sub channels where "0" representing the free state is described to the upper stream path frame information as the output destination of the data corresponding to the respective sub channels I1.

More specifically, in the present embodiment, "1" representing the use state is described in the eight sub channels I1, I2, I5, I6, I9, I10, I13 and I14 of the sub channels of the first and second input ports P1 and P2 corresponding to the various functional equipments N8 and N9, and at least eight sub channels S1 through S8 where "0" is representing the free state" is described exist in the upper stream path information frame. For this reason, the aforementioned eight sub channels S1 through S8 comprised in the upper stream path information frame are allocated as the output destination of the data corresponding to the respective sub channels I. Since this allocating process allocates the data to the sub channels S1 through S8, as shown in FIG. 6, the state in the sub channels S1 through S8 in the self path information frame is updated to be "1" representing the use state. In such a manner, when the path information of the sub channels II, I2, I5, I6, I9, I10, I13 and I14 of the first and second input ports P1 and P2 corresponding to the functional equipments N8 and N9 and the path information of the prescribed sub channels S1 through S8 comprised in the upper stream path information frame is decided in the route hub RH3, and the communication paths of the data in the route hub RH3 are secured, data whose destination is specified as the functional equipment N belonging to another route hub RH in the communication data outputted from the functional equipments N8 and N9 are outputted to another route hub RH.

As mentioned above, according to the communication method and communication system according to the first embodiment of the present invention, instead of the central management of the communication paths between the repeating installations using a central managing device, a repeating installation of the plural repeating installations compares and refers to another path information including the use/free states of the channels of the other repeating installations received by the other repeating installations and the use/free states of the channels corresponding to one or more node terminals connected with the repeating installation itself, and the path information of input-output data inputted/outputted into/from the self repeating installation is decided. As a result, since the allocation of the communication channels of the input-output data is managed individually and dispersively, the processing load due to the path management in the respective repeating installations is reduced and the processing time required for the path management in the repeating installations is reduced. As a result, for example, even in the case where data are exchanged between node terminals belonging respectively to different repeating installations, the communication data can be transmitted securely to the destination node terminal specified by the originating source node terminal.

Figure 8:
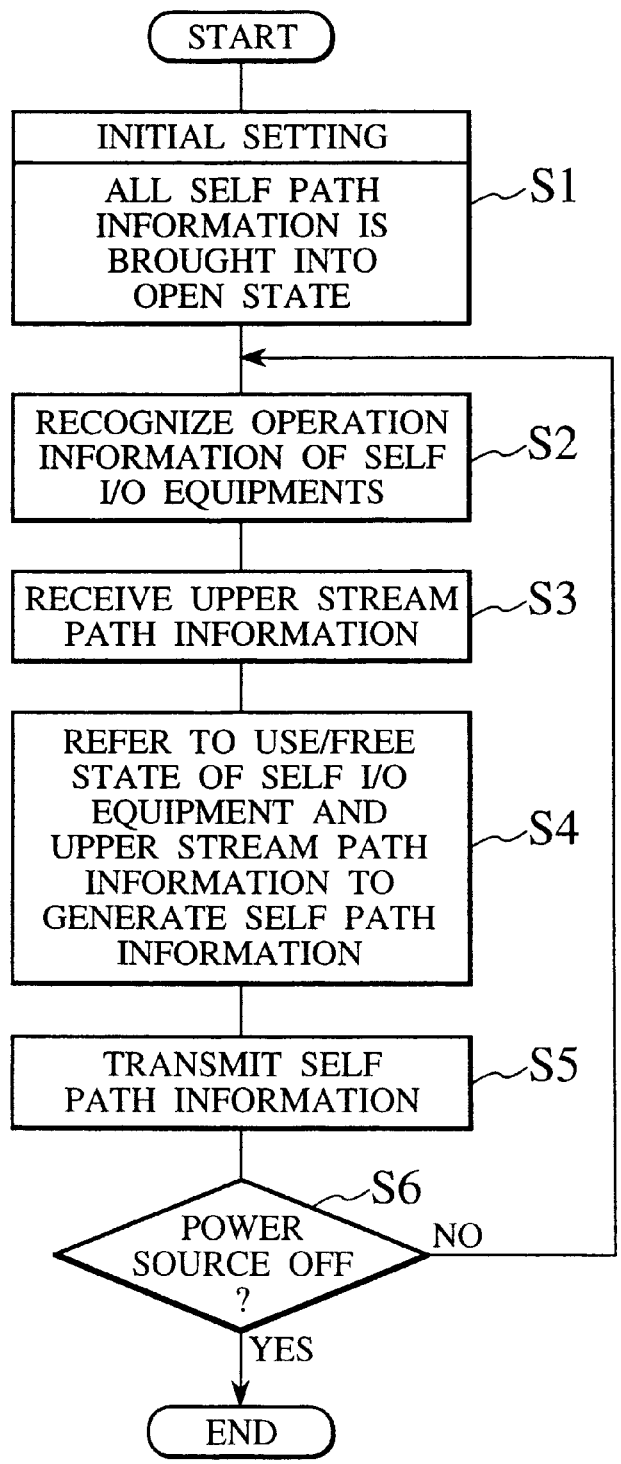
FIG. 8 is an operational flow chart of each repeating installation to be the main section of the communication system according to the first embodiment of the present invention.
Figure 9:
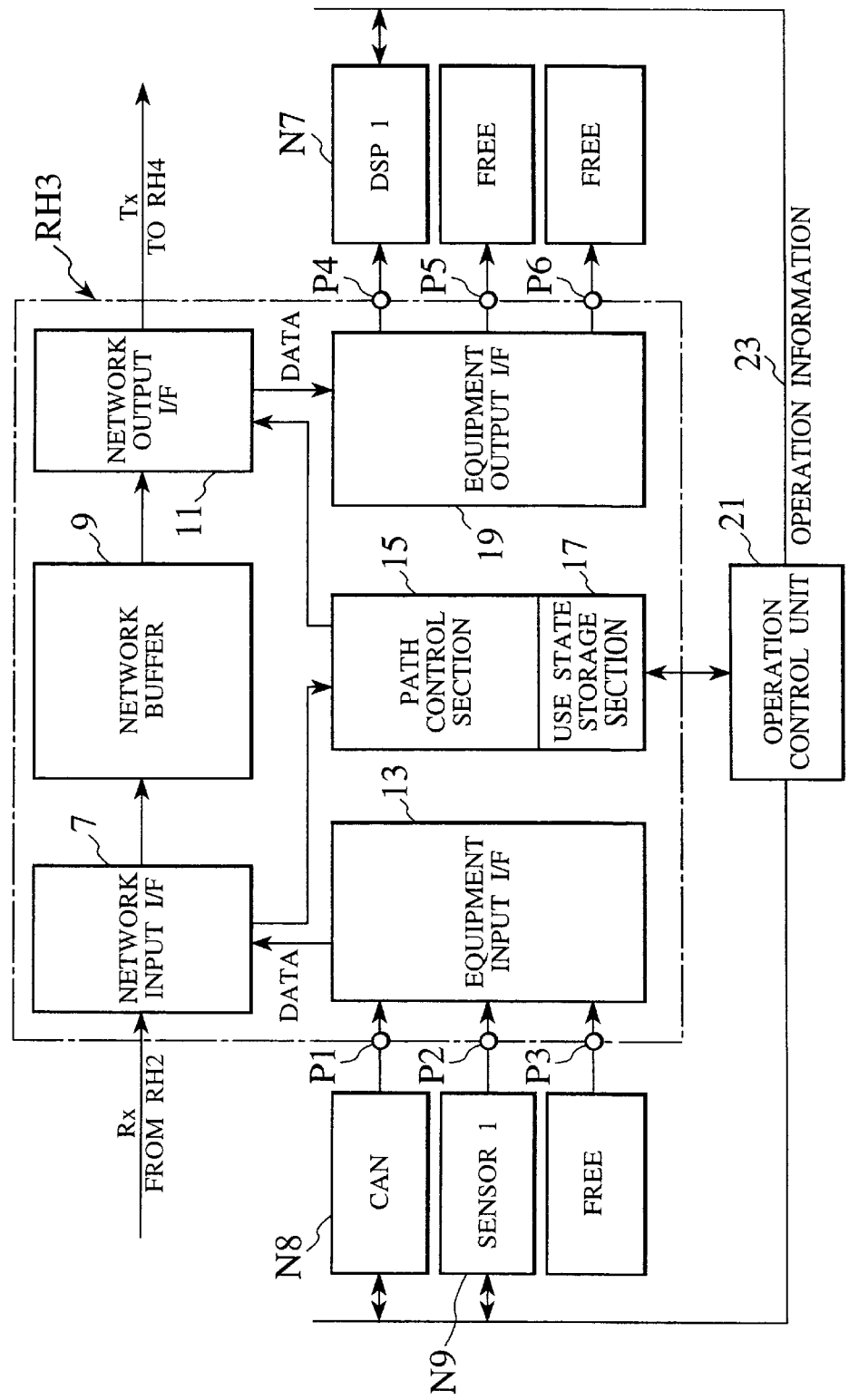
FIG. 9 is a block constitutional drawing of the repeating installation to be the main section of the communication system according to the second and third embodiments of the present invention.

The following describes the operation of the route hubs RH as the repeating installations by typically exemplifying the processing procedure of the communication data in the route hub RH3 shown in FIG. 2 on reference to the operational flow chart shown in FIG. 8.

When the communication system 1 is turned on, the path control section 15 performs the process for setting the sub channels in the self path information frame to be in free state as the initial setting process (Step S1).

When the initial setting process at S1 is completed, the operation control unit 21 always monitors and inputs operation information relating to operation states of the various functional equipments N7, N8 and N9 connected with the route hub RH3 and transmits the inputted operation information to the path control section 15. Accordingly, the path control section 15 refers to the operation information of the functional equipments N7, N8 and N9 inputted from the operation control unit 21 and always updates the use/free state of the sub channels of the I/O ports allocated respectively to the functional equipments N7, N8 and N9 so as to store the updated use/free states in the use state storage section 17 in order to always maintain the latest states. As a result, the path control section 15 grasps all the use/free states of the sub channels of the I/O ports corresponding to the functional equipments N7, N8 and N9 based on the stored contents in the use state storage sections 17 (Step S2).

The network input I/F 7 receives and inputs communication data including upper stream free information containing the use/free states of the channels in the route hub RH2 transmitted from the route hub RH2 positioned on the upper stream side via the data transmission line 3b (Step S3), and transmits the inputted communication data including the upper stream free information to the path control section 15. Accordingly, the path control section 15 compares and refers to the upper stream free information and the use/free states of the sub channels of the I/O ports allocated to the functional equipments N7, N8 and N9 read from the use state storage section 17 so as to decide the path information of the input-output data inputted/outputted into/from the route hub RH3. As a result, the path control section 15 performs the allocation of the communication channels of the input-output data is managed individually and dispersively, whereas generates self output side path information containing the use/free states of the channels of the route hub RH3 (step S4).

Here, as mentioned above, in the case where data output hose destination is the functional equipment N connected with the route hub RH3 exists on the basis of the use/free states of the channels of the route hub 2 described in the upper stream free information, the corresponding sub channels in the upper stream information are updated from use state to free state, whereas in the case where data input whose originating source is the functional equipment N connected with the route hub RH3 exists, the prescribed sub channels in the free state in the upper stream free information are converted and updated to be the use state. As a result, the self output side path information generated at step S4 is generated. Therefore, instead of the central management of data using a central managing device, the route hub RH3 refers to I/O balance of the data with respect to the route hub RH3 and simultaneously managing the communication paths of data individually and dispersively. Therefore, the processing load due to the path management in the route hub RH3 is reduced, and the processing time required for the path management in the route hub RH3 is shortened. As a result, for example, in the case where data are exchanged between the functional equipments belonging respectively to different route hubs RH, the communication data can be transmitted securely to the destination specified by the originating source.

When the self output side path information is generated at step S4, the path control section 15 transmits the generated self output side path information to the network output I/F 11, and accordingly the network output I/F 11 transmits the communication data including the self output side path information to the route hub RH4 positioned on the lower stream side via the data transmission line 3c (Step S5).

When the transmission of the self output side path information is completed at step S5, a node terminal power source confirming circuit, not shown, comprised in the route hub RH3 judges as to whether or not the node terminal is turned off (Step S6). As a result of the judgment at step S6, when the power of the node terminal is ON, the path control section 15 returns the procedure to step S2 and repeats the step S2 and the following, whereas when the power of the node terminal is switched to OFF state, all the steps are completed.

Figure 10:
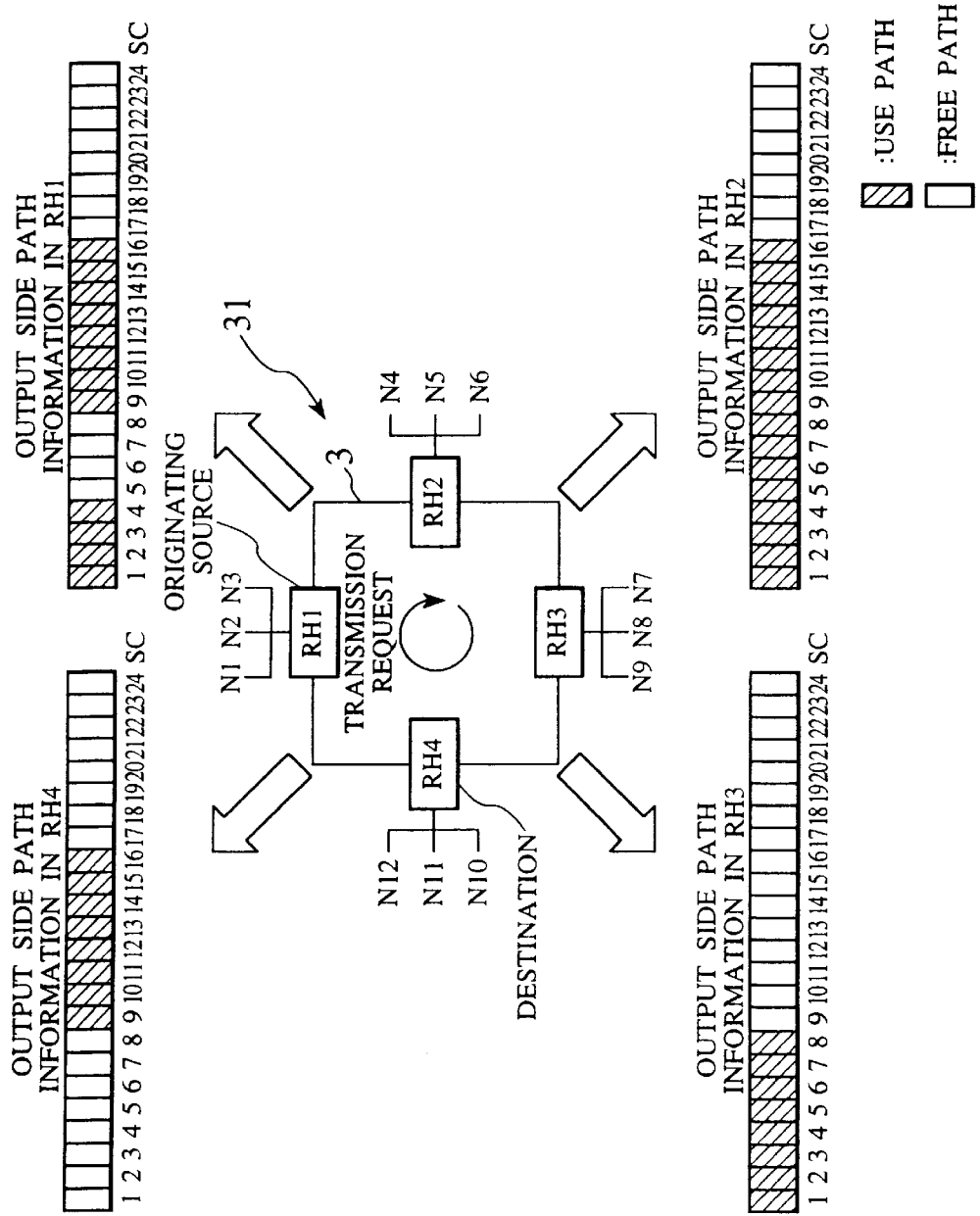
FIG. 10 is a drawing showing the output side path information of each repeating installation composing the communication system according to the second and third embodiments.
Figure 11:
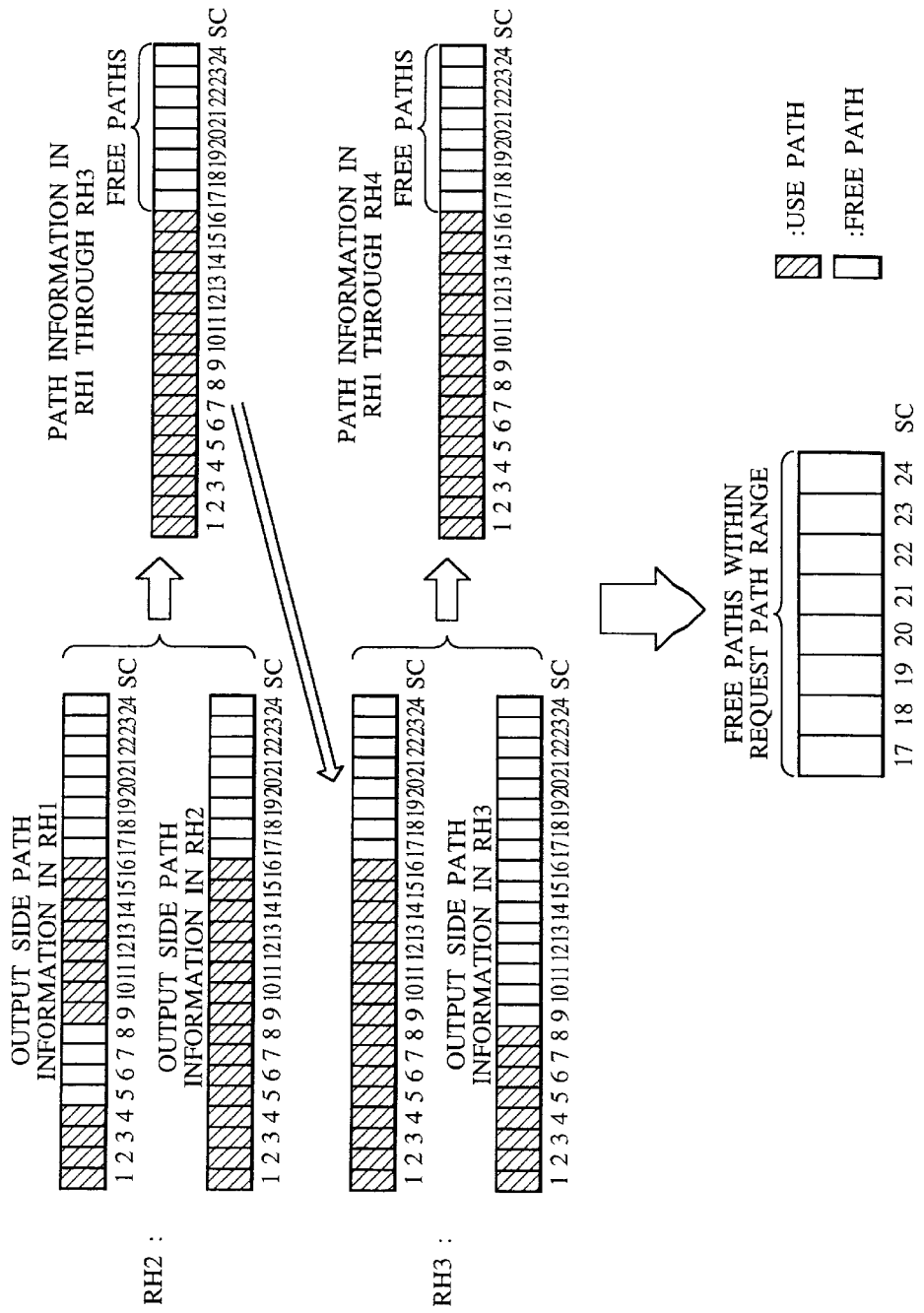
FIG. 11 is a drawing showing a flow when a passing path of communication data is secured based on the output side path information of each repeating installation existing within the range of a request path composing the communication system according to the second and third embodiments.
Figure 12:
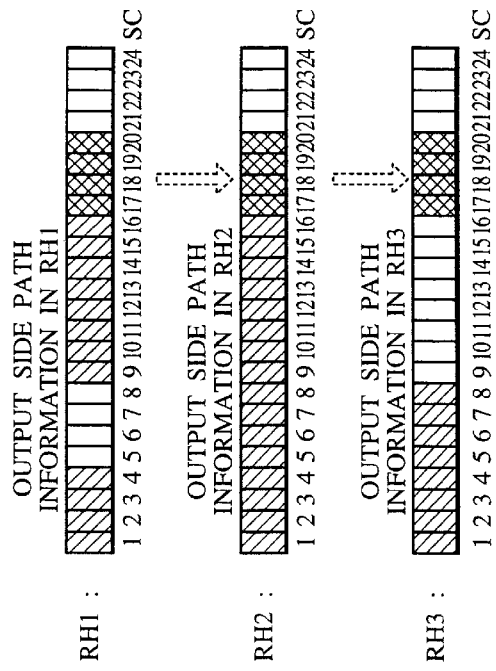
FIG. 12 is a drawing showing a flow when a passing path of communication data is secured based on the output side path information of each repeating installation existing within the range of a request path composing the communication system according to the second and third embodiments.
Figure 13:
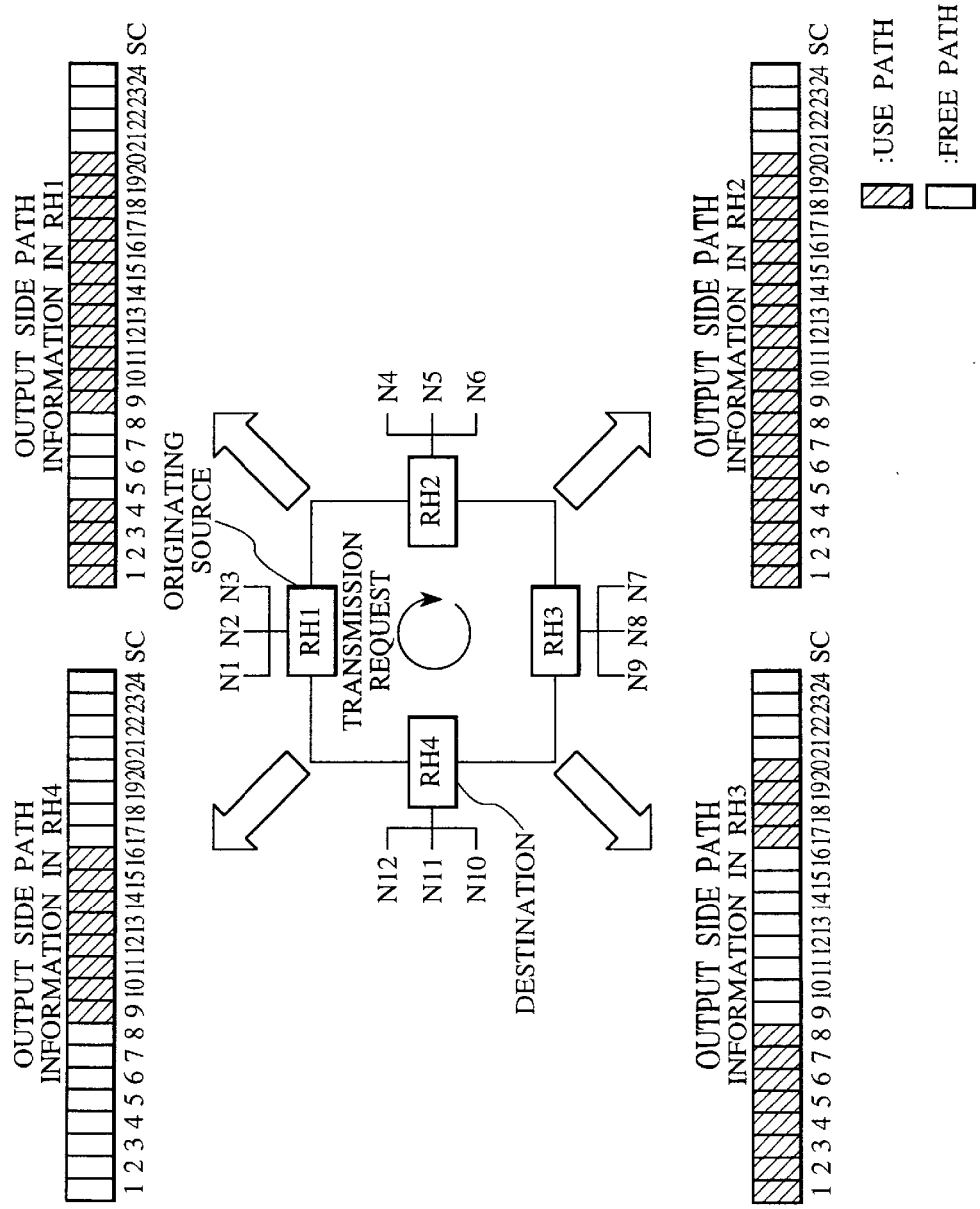
FIG. 13 is a drawing showing the output side path information after the request path is determined in each repeating installation composing the communication system according to the second and third embodiments.
Figure 14:
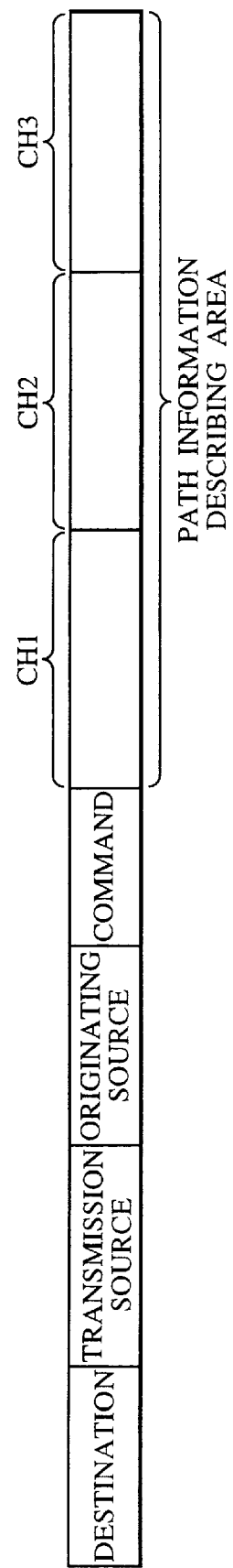
FIG. 14 is a drawing showing a data format used in the communication system according to the second and third embodiments.

The following describes the communication method and communication system according to the second embodiment of the present invention on reference to FIGS. 9 through 14. The communication system 31 according to the second embodiment has the same arrangement as that of the communication system according to the first embodiment in appearance, but there is partial difference in the function of the route hubs RH as the repeating installations, so the description is given centering on the difference. Moreover, as for the drawings used for the description of the communication system 31 according to the second embodiment, as shown in FIGS. 10 and 13, for the convenience, the route hub RH5 is deleted from the communication system 1 according to the first embodiment.

In the communication system 31 according to the second embodiment, a path request repeating installation which makes a transmission request of communication data in plural repeating installations composing the communication system has a function for requesting the repeating installations existing within the request path range from the originating source to the destination of the communication data to return the path information containing the free states of the output side paths, and selecting definite path through which the communication data pass based on the returned path information in the repeating installations, and transmitting the definite path information containing the selected definite paths to the repeating installations existing within the request path range. Meanwhile, the respective repeating installations existing within the request path range have a function for revising the path information based on the received definite path information. By making these functions effective, in the communication system 31 according to the second embodiment, when the communication path of the communication data is secured, the communication procedure between the repeating installations is simplified.

In order to making the functions effective, instead of the use state storage section 17 contained in the route hub RH used in the communication system 1 according to the first embodiment, the route hub RH used in the communication system 31 according to the second embodiment adopts a path information storage section 29 for storing the path information containing the free state of the output side paths, whereas the path control section 15 additionally has a function for when a node terminal connected with the route hubs RH or route hub RH3 makes transmission request of communication data, requesting the repeating installations existing within the request path range to return the path information, and selecting definite paths through which the communication data pass based on the returned path information of the repeating installations, and transmitting the definite path information containing the definite paths selected to the repeating installations existing within the request path range, whereas when receiving the definite path information from the path requesting repeating installation, revising the path information based on the received definite path information.

In addition, instead of the path information describing area in the frame format of the communication data transmitted in the communication system 1 according to first embodiment, in the frame format of the communication data transmitted in the communication system 31 according to the second embodiment, a path information describing area where path information is described is adopted.

The following describes the processing procedure of the communication data in the respective route hubs RH by exemplifying the case where the functional equipment N1 connected with the route hub RH1 is an originating source and the functional equipment N12 connected with the route hub RH4 is a destination, and the route hub RH1 makes a transmission request of communication data using four sub channels (SC) as communication capacity on reference to FIGS. 10 through 13. In this case, the route hub RH1 is a path requesting route hub RH, whereas the route hubs RH1 through RH3 are route hubs RH existing within the request path range.

First, the path request route hub RH1 investigates a free state of paths within the request path range from the originating source to destination of communication data, and in order to secure paths in free state as the path of communication data, requests the route hubs RH1 through RH3 existing within the request path range to return path information containing free states of the respective output side paths. One example of the path information of the route hubs RH1 through RH3 at this time is shown in FIG. 10, and the route hubs RH1 through RH3 successively returns the path information to the path request route hub RH1.

When receiving the path information returned from the route hubs RH1 through RH3, the path control section 15 of the path request route hub RH1, as shown in FIG. 11, performs first OR operation of the path information of the route hub RH1 and the path information of the route hub RH2. By the first OR operation, free paths of the route hub RH1 through the route hub RH3 are obtained, and more specifically, it is found that eight sub channels (SC) 17 through 24 are free paths.

Further, as shown in FIG. 11, the path control section 15 of the path request route hub RH1 performs second OR operation of the result of the first OR operation and the path information of the route hub RH3. By the second OR operation, free paths within the request path range of the route hub RH1 as the path request repeating installation through the route hub RH4 as the destination repeating installation are obtained, and more specifically, it is found that eight sub channels (SC) 17 through 24 are free paths.

Then, as shown in FIG. 11, the path control section 15 of the path request route hub RH1 selects four free paths (SC17 through SC20) as the definite paths from the eight free paths (SC17 through SC24) within the request path range obtained by the second OR operation using, for example, a left-sided path selecting method, and stores the definite path information containing the selected definite paths in a prescribed address of the path information storage section 29. As a result, in the path request route hub RH1, the pass paths of the communication data are decided.

Thereafter, as shown in FIG. 12, the path control section of the path request route hub RH1 transmits the definite path information to the route hubs RH1 through RH3 existing within the request path range in order to obtain the selected definite paths in the route hubs RH1 through RH3 existing within the request path range.

Accordingly, as shown in FIG. 12, the route hubs RH1 through RH3 existing within the request path range revised the definite paths (SC17 through SC20) transmitted from the path request route hub RH1 in the path information as use paths. As a result, as shown in FIG. 13, the path information of the respective route hubs RH is updated to be the path information where sub channels corresponding to the definite paths (SC17 through SC20) are revised into free paths, and thus the pass paths of the communication data from the originating source to the destination are secured.

According to the communication method and communication system of the second embodiment, the path request repeating installation making a transmission request of the communication data in the plural repeating installations first requests the repeating installations existing the request path range from the originating source to the destination of the communication data to return path information containing a free state of the output side paths, and selects definite paths through which the communication data pass based on the returned path information of the repeating installations so as to transmit the definite path information containing the selected definite paths to the repeating installations existing within the request path range, whereas the respective repeating installations existing the request path range revise their path information based on the received definite path information, and thus can secure the pass paths of the communication data prior to the transmission of the communication data from the path request repeating installation, and when the pass paths of the communication data are secured, the communication procedure between the repeating installations is simplified. As a result, even in the case where data are exchanged between node terminals belonging respectively to different repeating installations, communication data can be transmitted securely to the destination node terminal specified by the originating source node terminal.

Further, as the third embodiment which is a modified example of the present invention according to the second embodiment, the procedure of obtaining common free paths between the output side path information of the route hubs RH existing within the request path range can be changed as follows.

Namely, the path request route hub RH1 first transmits the self output side path information to the route hub RH2 existing in the lower stream side. Accordingly, the route hub RH2 performs first OR operation of the output side path information of the path request route hub RH1 and the output side path information of the route hub RH2, and transmits the result of the first OR operation to the route hub RH3 existing in the lower stream side. Common free paths between the output side path information of the route hubs RH1 and RH2 can be obtained by the first OR operation.

When receiving the result of the first OR operation transmitted from the route hub RH2, the route hub RH3 performs second OR operation of the result of the first OR operation and the output side path information of the route hub RH3, and transmits the result of the second OR operation to the route hub RH4 existing in the lower stream side. When receiving the result of the second OR operation, the route hub RH4 returns the result of the second OR operation to the path request route hub RH1. Common free paths between the output side path information of the route hubs RH existing within the request path range can be obtained by the second OR operation.

According to the communication method and communication system of the third embodiment, the path request repeating installation making a transmission request of communication data in the plural repeating installations first returns common free paths between output side path information of the respective repeating installations, which is obtained by referring to the path information containing the free states of the output side paths of the repeating installations existing within the request path range from the originating source to the destination of the communication data, from the repeating installations existing within the request path range to the path request repeating installation, and selects definite paths through which the communication data pass based on the returned common free paths between the output side path information of the repeating installations so as to transmit the definite path information containing the selected definite paths to the repeating installations existing within the request path range. Meanwhile, the repeating installations existing within the request path range revise their path information based on the received definite path information, and thus the pass paths of the communication data can be secured prior to the transmission of the communication data from the path request repeating installation, and when the pass paths of the communication data are secured, the communication procedure between the repeating installations is simplified. As a result, for example, in the case where data are exchanged between node terminals belonging respectively to different repeating installations, the communication data can be transmitted securely from the originating source node terminal to the specified destination node terminal.

The above described in detail, but the present invention is not limited to the aforementioned embodiments, so the present invention can be realized by suitable modification without departing from the spirit or scope of the following claims.

Namely, for example, the communication system of the present invention can be constituted so that in the case where data where a node terminal connected with a repeating installation is specified as a destination exist in the received communication data, and in the case where the data are sound information of urgency having higher priority and the node terminal as the destination is an audio amplifier containing a digital signal processor (DSP) connected with a speaker, the repeating installation which received the communication data containing the sound information set prescribed sub channels in plural sub channels allocated to the destination node terminal to free state forcibly regardless of the use/free state of the destination node terminal, and the sound information having higher priority is outputted through the sub channels in the free state.

In addition, for example, the communication system of the present invention can be constituted so that in the case where data where a node terminal connected with a repeating installation is specified as a destination exist in the received communication data, and in the case where the data are picture information of urgency having higher priority and the node terminal as the destination is a monitor unit which can display a digital picture information on a screen, in the similar manner to the sound information, the repeating installation which received the communication data containing the picture information with higher priority set prescribed sub channels for on-screen in plural sub channels allocated to the destination node terminal to free state forcibly regardless of the use/free state of the destination node terminal, and the picture information having higher priority is outputted through the sub channels for on-screen in the free state.

In order to realize priority interruption of the aforementioned sound information or picture information, a priority describing area where priority is described is additionally set in the frame format of the communication data, and as the arrangement of the repeating installations, priority interruption control unit discriminating priority of the received communication and when the priority of the received communication data is high, setting required sub channels in plural sub channels allocated to the destination node terminal to free state forcibly may be added.

Further, according to the communication system 1 according to the first embodiment of the present invention, since the respective route hubs RH manages communication paths of data individually and dispersively, in the case where, for example, transmission capacity of the data transmission line 3 is 192 bit/unit time, namely, communication data of 64 bit only for three channels can be transmitted per unit time via the data transmission line 3, when the communication data for three channels are transmitted from the route hub RH1 to the route hub RH3 via the data transmission lines 3a and 3b in FIG. 1, at the same time the communication data for three channels are transmitted from the route hub RH4 to the route hub RH5 via the data transmission line 3d, and thus the communication data for six channels, i.e., twice as much as the data transmission line 3, can be transmitted in the communication system 1.

Similarly, according to the communication system according to the second and third embodiments of the present invention, since the path request route hub RH manages pass paths of the communication data within the request path range centrally, in the case where plural path request route hubs RH make a path request individually and respective use paths are not overlapped, the communication data with transmission capacity not less than twice as much as the data transmission line can be transmitted in the communication system.

Furthermore, the communication system of the present invention can be arranged so that in the case where communication data are priority data, the path request route hub RH, which makes a transmission request of the priority data whose originating source is the path request route hub RH self or a functional equipment N connected with the path request route hub RH, sets preset paths in the paths up to a destination of the priority data forcibly as free paths, and thus the pass paths are secured.

In addition, in the communication system according to the second and third embodiments of the present invention, the embodiment refers to the example such that when the OR operation between the path information of the repeating installation existing within the request path range is performed, common free paths between the path information of the repeating installations within the path request range are obtained, but the present invention is not limited to this embodiment, so the common paths between the path information of the repeating installations existing within the request path range can be obtained by performing the AND operation between the path information of the repeating installations existing within the request path range.

According to the communication system of the present invention, it is needless to say that the respective repeating installations perform a connecting process between channels between the node terminals connected with the repeating installations, and thus data can be exchanged between the node terminal connected to the respective repeating installations.

What is claimed is:

1. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:

comparing and referring, in each repeating installation, to another path information, in which usage states of plural channels of the other repeating installations other than the repeating installation itself are described, included in communication data received from the other repeating installations and usage states of channels corresponding to the one or more node terminals connected with the repeating installation itself; and deciding, in each repeating installation, path information of input-output data input to or output from the repeating installation itself;

whereby each repeating installation individually and dispersively manages allocation of communication channels of the input-output data.

2. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:

comparing and referring, in each repeating installation, to another path information, in which usage states of plural channels of the other repeating installations other than the repeating installation itself are described, included in communication data received by the other repeating installations and usage states of channels corresponding to the one or more node terminals connected with the repeating installation itself;

deciding, in each repeating installation, path information of input-output data input to or output from the repeating installation itself;

generating, in each repeating installation, output side path information of the repeating installation itself where the usage states of the channels of the repeating installation itself is described; and transmitting the communication data including the generated output side path information of the repeating installation itself to the other repeating installations other than the repeating installation itself;

whereby each repeating installation individually and dispersively manages allocation of communication channels of the input-output data.

3. The communication method according to claim 2, wherein the output side path information of the repeating installation itself is generated, based on the usage states of plural channels of the other repeating installations other than the repeating installation itself described in the other path information, by updating corresponding channels in the other path information from use state to free state in the case where data output whose destination is a node terminal connected with the repeating installation itself exist, and by updating prescribed channels in free states in the other path information to be in use state in the case where data input whose originating source is a node terminal connected with the repeating installation itself.

4. The communication method according to claim 3, wherein in the case where data input whose originating source is a node terminal connected with the repeating installation itself exist and a destination of the data input is a node terminal connected with the repeating installation itself, decision of paired pieces of the path information corresponding to the paired node terminals is not prevented.

5. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:

comparing and referring, in each repeating installation, to another path information, in which usage states of plural channels of the other repeating installations other than the repeating installation itself is described, included in communication data received by the other repeating installations and usage states of channels corresponding to the one or more node terminals connected with the repeating installation itself; and deciding, in each repeating installation, path information of input-output data input to or output from the repeating installation itself, based on whether or not priority data having high priority whose destination is a node terminal connected with the repeating installation itself exist in the communication data;

whereby each repeating installations individually and dispersively manage allocation of communication channels of the input-output data.

6. The communication method according to claim 5, wherein when priority data having high priority whose destination is a node terminal connected with the repeating installation itself exist in the communication data, path information is decided so that the priority data are given priority in interruption and output via a desired channel regardless of usage states of channels corresponding to the node terminal as the destination.

7. A communication system comprising plural repeating installations connected via a data transmission line, each repeating installation connected with one or more node terminals, said communication system exchanging data between the node terminals, between the repeating installations or between the node terminals and repeating installations, said each repeating installation comprising:

a receiving unit receiving communication data including another path information in which usage states of plural channels of the other repeating installations other than the repeating installation itself are described, from the other repeating installation;

a state judging unit judging usage states of channels corresponding to one or more node terminals connected with the repeating installation itself; and a path information deciding unit comparing and referring to another path information included in the communication data received by the receiving unit and the usage states of the channels corresponding to the one or more node terminals connected with the repeating installation itself judged by the state judging unit to decide path information of input-output data input to or output from the repeating installation itself;

whereby the path information deciding unit individually and dispersively manages allocation of communication channels for the input-output data.

8. A communication system comprising plural repeating installations connected via a data transmission line, each repeating installation connected with one or more node terminals, said communication system exchanging data between the node terminals, between the repeating installations or between the node terminals and repeating installations, said each repeating installation comprising:

a receiving unit receiving communication data including another path information in which use/free states of plural channels of the other repeating installations other than a repeating installation itself are described, from the other repeating installation;

a state judging unit judging usage states of channels corresponding to one or more node terminals connected with the repeating installation itself;

a path information deciding unit comparing and referring to another path information included in the communication data received by the receiving unit and the usage states of the channels corresponding to the one or more node terminals connected with the repeating installation itself judged by the state judging unit to decide path information of input-output data input to or output from the repeating installation itself;

a self path information generating unit comparing and referring to another path information included in the communication data received by the receiving unit and the usage states of the channels corresponding to the one or more node terminals connected with the repeating installation itself judged by the state judging unit to generate self output side path information where usage states of the channels of the repeating installation itself is described; and a transmitting unit transmitting the communication data including the self output side path information generated by the self path information generating unit to the other repeating installations other than the repeating installation itself;

whereby the path information deciding unit individually and dispersively manages allocation of communication channels for the input-output data.

9. The communication system according to claim 8, wherein the self path information generating unit generates the self output side path information, based on the usage states of plural channels of the other repeating installations described in the other path information, by updating corresponding channels in another path information from use state to free state in the case where data output whose destination is a node terminal connected with the repeating installation itself exist, and by updating prescribed channels in free states in the other path information to be in use state in the case where data input whose originating source is a node terminal connected with the repeating installation itself.

10. The communication system according to claim 9, wherein in the case where data input whose originating source is a node terminal connected with the repeating installation itself exist and a destination of the data input is a node terminal connected with the repeating installation itself, decision of paired pieces of the path information corresponding to the paired node terminals is not prevented.

11. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:

requesting from a path request repeating installation requesting transmission of communication data in the plural repeating installations to repeating installations existing within a request path range from an originating source to destination of the communication data to return path information containing free state of respective output side paths;

selecting, in the path request repeating installation, definite paths through which the communication data pass based on the respective path information returned from the repeating installations existing within the request path range;

transmitting the definite path information containing the selected definite paths from the path request repeating installation to the repeating installations existing within the request path range;

revising the respective path information, in the repeating installations existing within the request path range, based on the definite path information received from the path request repeating installation to secure pass paths for the communication data prior to transmission of the communication data from the path request repeating installation.

12. The communication method according to claim 11, further comprising:

obtaining, in the path request repeating installation, common free paths between the path information in the repeating installations existing within the request path range by performing logical operation of the respective path information returned from the repeating installations existing within the request path range; and selecting, in the path request repeating installation, definite paths through which the communication data pass from the obtained common free paths between the path information of the repeating installations existing within the request path range.

13. The communication method according to claim 11, wherein the repeating installations existing within the request path range update the selected definite paths in free state to be in use state based on the definite path information received from the path request repeating installation to revise the respective path information.

14. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:

requesting from a path request repeating installation requesting transmission of communication data in the plural repeating installations to repeating installations existing within a request path range from an originating source to destination of the communication data to return path information containing free state of respective output side paths;

obtaining, in the path request repeating installation, common free paths between the path information in the repeating installations existing within the request path range by performing logical operation of the respective path information returned from the repeating installations existing within the request path range;

selecting, in the path request repeating installation, definite paths through which the communication data pass from the obtained common free paths between the path information of the repeating installations existing within the request path range;

transmitting the definite path information containing the selected definite paths from the path request repeating installation to the repeating installations existing within the request path range; and updating, in the repeating installations existing within the request path range, the selected definite paths in free state to be in use state based on the definite path information received from the path request repeating installation to revise the respective path information and thus securing pass paths for the communication data prior to transmission of the communication data from the path request repeating installation.

15. A communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations includes:

a path information return requesting unit requesting the repeating installations existing within the request path range from a transmission source to destination of the communication data to return path information containing free state of respective output side paths;

a selecting unit selecting definite paths through which the communication data pass based on the respective path information returned from the repeating installations existing within the request path range; and a definite path information transmitting unit transmitting the definite path information containing the definite paths selected by the selecting unit to the repeating installations existing within the request path range; and wherein the respective repeating installations existing within the request path range include:

a) a definite path information receiving unit receiving the definite path information from the path request repeating installation; and b) a path information revising unit revising the respective path information based on the definite path information received by the definite path information receiving unit;

whereby the respective repeating installations existing within the request path range secures pass paths of the communication data prior to transmission of the communication data from the path request repeating installation.

16. The communication system according to claim 15, wherein the path request repeating installation further includes a free path operating unit obtaining common free paths between path information of the repeating installations existing within the request path range by performing the logical operation on the respective path information returned from the repeating installations existing within the request path range; and the selecting unit selecting definite paths through which the communication data pass from the common free paths between the path information of the repeating installations existing within the request path range obtained by the free path operating unit.

17. The communication system according to claim 15, wherein the path information revising unit updates the selected definite paths in free state to be in use state based on the definite path information received by the definite path information receiving unit so as to revise the respective path information.

18. A communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations includes:
   a path information return requesting unit requesting the repeating installations existing within the request path range from an originating source to destination of the communication data to return path information containing free state of respective output side paths;
   a free path operating unit obtaining common free paths between path information of the repeating installations existing within the request path range by performing the logical operation on the respective path information returned from the repeating installations existing within the request path range;
   a selecting unit selecting definite paths through which the communication data pass from the common free paths between the path information of the repeating installations existing within the request path range obtained by the free path operating unit; and
   a definite path information transmitting unit transmitting the definite path information containing the definite paths selected by the selecting unit to the repeating installations existing within the request path range; and
   wherein the respective repeating installations existing within the request path range include:
      a) a definite path information receiving unit receiving the definite path information from the path request repeating installation; and
      b) a path information revising unit updating the definite paths selected by the selecting unit in free state to be in use state based on the definite path information received by the definite path information receiving unit so as to revise the respective path information;
   whereby the respective repeating installations existing within the request path range secure pass paths of the communication data prior to transmission of the communication data from the path request repeating installation.

19. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:
   returning common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation requesting transmission of communication data in the plural repeating installations;
   selecting, in the path request repeating installation, definite paths through which the communication data pass from the returned common free paths between the output side path information of the repeating installations;
   transmitting the definite path information containing the selected definite paths to the repeating installations existing within the request path range; and
   revising, in the respective repeating installations existing within the request path range, the respective path information based on the definite path information received from the path request repeating installation to secure pass paths for the communication data prior to transmission of the communication data from the path request repeating installation.

20. A communication method used in a communication system arranged by connecting plural repeating installations, to which one or more node terminals are connected, via a data transmission line, said communication method exchanging data between the node terminals, between the repeating installations or between the node terminals and repeating installations, said communication method comprising:
   returning common free paths between output side path information of the respective repeating installations, which are obtained by referring to path information containing free state of output side paths of the repeating installations existing within a request path range from an originating source to destination of the communication data, from the repeating installations existing within the request path range to the path request repeating installation requesting transmission of communication data in the plural repeating installations;
   selecting, in the path request repeating installation, definite paths through which the communication data pass from the returned common free paths between the output side path information of the repeating installations;
   transmitting the definite path information containing the selected definite paths to the repeating installations existing within the request path range; and
   updating, in the repeating installations existing within the request path range, the selected definite paths in free state to be in use state based on the definite path information received from the path request repeating installation to revise the respective path information, thereby to secure pass paths for the communication data prior to transmission of the communication data from the path request repeating installation.

21. A communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations includes:

a path information return requesting unit requesting to return common free paths between output side path information of the respective repeating installations, which are obtained by referring to path information containing free state of the output side paths of the repeating installations existing within a request path range from an originating source to destination of the communication data, from the repeating installations existing within the request path range to the path request repeating installation;

a selecting unit selecting definite paths through which the communication data pass based on the respective path information returned from the repeating installations existing within the request path range; and a definite path information transmitting unit transmitting the definite path information containing the selected definite paths selected by the selecting unit to the repeating installations existing within the request path range; and wherein the respective repeating installations existing within the request path range include:
  a) a definite path information receiving unit receiving the definite path information from the path request repeating installation; and
  b) a path information revising unit revising the respective path information based on the definite path information received by the definite path information receiving unit;

whereby the respective repeating installations existing within the request path range secure pass paths for the communication data prior to transmission of the communication data from the path request repeating installation.

22. A communication system comprising plural repeating installations connected via a data transmission line, each repeating installation connected with one or more node terminals, said communication system exchanging data between the node terminals, between the repeating installations or between the node terminals and repeating installations, wherein a path request repeating installation requesting transmission of communication data in the plural repeating installations includes:

a path information return requesting unit requesting to return common free paths between output side path information of respective repeating installations, which are obtained by referring to path information containing free state of output side paths of the repeating installations existing within a request path range from an originating source to destination of the communication data, from the repeating installations existing within the request path range to the path request repeating installation;

a selecting unit selecting definite paths through which the communication data pass based on respective path information returned from the repeating installations existing within the request path range; and a definite path information transmitting unit transmitting the definite path information containing the definite paths selected by the selecting unit to the repeating installations existing within the request path range; and wherein the respective repeating installations existing within the request path range include:
  a) a definite path information receiving unit receiving the definite path information from the path request repeating installation; and
  b) a path information revising unit updating the definite paths selected by the selecting unit in free state to be in use state based on the definite path information received by the definite path information receiving unit so as to revise the respective path information;

whereby the respective repeating installations existing within the request path range secure pass paths for the communication data prior to transmission of the communication data from the path request repeating installation.

* * * * *

UNITED STATES PATENT AND TRADEMARK OFFICE
CERTIFICATE OF CORRECTION

PATENT NO.    : 6,512,777 B1
DATED         : January 28, 2003
INVENTOR(S)   : Yoshinori Nakatsugawa It is certified that error appears in the above-identified patent and that said Letters Patent is hereby corrected as shown below:

Title page,
Item [57], ABSTRACT,
Line 9, change "more node terminal" to -- more of the node terminals --.

Column 1,
Line 48, change "As a result, The" to -- As a result, the --.
Line 60, change "transmission a use" to -- transmission makes a use --.

Column 3,
Line 10, change "According the" to -- According to the --.

Column 4,
Line 22, change "terminal" to -- terminals --.

Column 5,
Line 22, change "installations" to -- installation --.

Column 9,
Line 29, change "comprises" to -- comprise --.
Line 56, change "aspect the" to -- aspect of the --.

Column 12,
Line 4, change "terminal" to -- terminals --.

Column 13,
Line 53, change "terminal" to -- terminals --.

Column 15,
Line 50, change "secured, and the" to -- secured, the --.

Column 20,
Line 15, change "FIG 7, plural information" to -- FIG 7. Plural information --.

Column 21,
Line 19, change "extracting 15 function" to -- extracting function --.

UNITED STATES PATENT AND TRADEMARK OFFICE
CERTIFICATE OF CORRECTION

PATENT NO. : 6,512,777 B1
DATED : January 28, 2003
INVENTOR(S) : Yoshinori Nakatsugawa It is certified that error appears in the above-identified patent and that said Letters Patent is hereby corrected as shown below:

<u>Column 23,</u>
Line 44, change "the free state" is described" to -- the "free state" is described --.

<u>Column 24,</u>
Line 67, change "hose" to -- whose --.

<u>Column 27,</u>
Line 49, change "existing the" to -- existing in the --.

<u>Column 31,</u>
Line 50, change "installations" to -- installation --.

Signed and Sealed this

Twelfth Day of August, 2003

JAMES E. ROGAN
*Director of the United States Patent and Trademark Office*